US012134810B2

(12) United States Patent
Maeda et al.

(10) Patent No.: US 12,134,810 B2
(45) Date of Patent: *Nov. 5, 2024

(54) STEEL SHEET FOR HOT STAMPING AND HOT-STAMPING FORMED BODY

(71) Applicant: NIPPON STEEL CORPORATION, Tokyo (JP)

(72) Inventors: Daisuke Maeda, Tokyo (JP); Yuri Toda, Tokyo (JP); Shingo Fujinaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/801,145

(22) PCT Filed: May 7, 2021

(86) PCT No.: PCT/JP2021/017509
§ 371 (c)(1),
(2) Date: Aug. 19, 2022

(87) PCT Pub. No.: WO2021/230150
PCT Pub. Date: Nov. 18, 2021

(65) Prior Publication Data
US 2023/0081832 A1 Mar. 16, 2023

(30) Foreign Application Priority Data

May 13, 2020 (JP) .................................. 2020-084592
May 13, 2020 (JP) .................................. 2020-084593

(51) Int. Cl.
| C22C 38/02 | (2006.01) |
| B21D 22/02 | (2006.01) |
| C22C 38/00 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/18 | (2006.01) |

(52) U.S. Cl.
CPC ............ *C22C 38/18* (2013.01); *B21D 22/022* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01)

(58) Field of Classification Search
CPC .......... C22C 38/02; C22C 38/04; C22C 38/06
See application file for complete search history.

(56) References Cited

U.S. PATENT DOCUMENTS

| 2013/0000791 A1* | 1/2013 | Takahashi ............... C22C 38/06 148/507 |
| 2013/0323112 A1 | 12/2013 | Okamoto et al. |
| 2014/0044989 A1 | 2/2014 | Toda et al. |
| 2015/0284819 A1 | 10/2015 | Tamaki et al. |
| 2020/0024706 A1 | 1/2020 | Nakano et al. |
| 2020/0181744 A1 | 6/2020 | Toda et al. |
| 2021/0140005 A1 | 5/2021 | Yoshida et al. |
| 2021/0269892 A1 | 9/2021 | Kim et al. |

FOREIGN PATENT DOCUMENTS

| CN | 110029274 A | 7/2019 |
| CN | 110139941 A | 8/2019 |
| CN | 110832098 A | 2/2020 |
| JP | 2015-30890 A | 2/2015 |
| JP | 6281284 B2 | 2/2018 |
| KR | 10-2020-0011742 A | 2/2020 |
| WO | WO 2012/121219 A1 | 9/2012 |
| WO | WO 2012/144567 A1 | 10/2012 |
| WO | WO 2014/027682 A1 | 2/2014 |
| WO | WO 2019/044970 A1 | 3/2019 |

OTHER PUBLICATIONS

Cerda et al., "Microstructure, texture and mechanical properties in a low carbon steel after ultrafast heating," Materials Science & Engineering A, vol. 672, 2016, pp. 108-120.

U.S. Office Action for U.S. Appl. No. 17/801,134, dated Feb. 29, 2024.

* cited by examiner

Primary Examiner — Adam Krupicka
(74) Attorney, Agent, or Firm — Birch, Stewart, Kolasch & Birch, LLP

(57) ABSTRACT

These steel sheet for hot stamping and hot-stamping formed body have predetermined chemical composition and metallographic structures, and, in textures of a surface layer region and an inside region, ratios between a pole density of an orientation group consisting of {001}<1-10> to {001}<-1-10> and a pole density of an orientation group consisting of {111}<1-10> to {111}<-1-12> are controlled.

10 Claims, No Drawings

STEEL SHEET FOR HOT STAMPING AND HOT-STAMPING FORMED BODY

TECHNICAL FIELD OF THE INVENTION

The present invention relates to a steel sheet for hot stamping and a hot-stamping formed body.

Priority is claimed on Japanese Patent Application No. 2020-084593 and Japanese Patent Application No. 2020-084592, filed May 13, 2020, the contents of which are incorporated herein by reference.

BACKGROUND ART

In recent years, there has been a demand for a reduction in the weight of the vehicle body of a vehicle in terms of environmental protection and resource saving, and a high strength steel sheet has been applied to vehicle members. Vehicle members are manufactured by press forming, but not only a forming load is increased but also the formability deteriorates as the strength of a steel sheet is increased. For this reason, the formability of the high strength steel sheet into a member having a complicated shape becomes an issue.

In order to solve this issue, the application of hot stamping technique in which press forming is performed after a steel sheet is heated up to a high temperature of an austenite range where the steel sheet softens is in progress. Hot stamping is attracting attention as technique that achieves both the formability of a steel sheet into a vehicle member and the strength of the vehicle member by performing the hardening of the steel sheet in a die at the same time as press working.

In order to obtain a higher effect of reducing the weight of a vehicle body from a vehicle member into which a steel sheet is formed by hot stamping, it is necessary to obtain a member that has high strength and is also excellent in collision characteristics. As a technique for improving the collision characteristics of a vehicle member, particularly, a technique for improving the bendability of the vehicle member is being studied.

Patent Document 1 discloses a high strength pressed component having excellent impact absorption characteristics, in which the hardness of the pressed component in the sheet thickness center is Hv400 or more, a soft layer having a hardness of Hv300 or less is provided in a surface layer of the pressed component, and the thickness of the soft layer is 20 to 200 μm.

Patent Document 2 discloses a high strength cold-rolled steel sheet having excellent uniform elongation and hole expansibility, in which the texture in the center portion of the steel sheet is controlled.

At the time of bending distortion, distortion starts from the surface of a vehicle member, and the distortion gradually progresses toward the inside of the vehicle member. Therefore, in order to further improve the bendability of the vehicle member, it is effective to enhance the bending distortion capability of the surface layer of the vehicle member and then enhance the bending distortion capability of the inside of the vehicle member. In Patent Documents 1 and 2, improvement in the bending distortion capabilities of both the surface layer area and the inside of the vehicle member are not taken into account.

In addition, when the surface layer of a vehicle member is softened in order to improve the bendability of the vehicle member, there is a problem of the deterioration of the load capacity.

PRIOR ART DOCUMENT

Patent Document

[Patent Document 1] Japanese Unexamined Patent Application. First Publication No. 2015-30890
[Patent Document 2] PCT International Publication No. WO2012/144567

DISCLOSURE OF THE INVENTION

Problems to be Solved by the Invention

The present invention has been made in view of the above-mentioned problem. An objective of the present invention is to provide a hot-stamping formed body having excellent strength and bendability and having high load capacity and a steel sheet for hot stamping enabling the obtainment of this hot-stamping formed body.

Means for Solving the Problem

The gist of the present invention is as follows.

(1) A steel sheet for hot stamping according to an aspect of the present invention containing, as a chemical composition, by mass %,
C: 0.15 to 0.50%,
Si: 0.0010% to 3.000%,
Mn: 0.30% to 3.00%,
Al: 0.0002% to 2.000%,
P: 0.100% or less,
S: 0.1000% or less,
N: 0.0100% or less,
Nb: 0% to 0.15%,
Ti: 0% to 0.15%,
V: 0% to 0.15%,
Mo: 0% to 1.0%,
Cr: 0% to 1.0%,
Cu: 0% to 1.0%,
Ni: 0% to 1.0%,
B: 0% to 0.0100%,
Ca: 0% to 0.010%,
REM: 0% to 0.30%, and
a remainder consisting of Fe and an impurity,
in which the steel sheet for hot stamping has a metallographic structure consisting of, by area ratio, a total of 20% to 80% of ferrite, granular bainite, bainite, and martensite and a remainder in microstructure consisting of pearlite and a carbide,
in a texture between a surface and a sheet thickness ¼ position from the surface, a ratio between a pole density of an orientation group consisting of {001}<1-10> to {001}<-1-10> and a pole density of an orientation group consisting of {111}<1-10> to {111}<-1-12> is less than 1.5, and
in a texture between the sheet thickness ¼ position from the surface and a sheet thickness ½ position from the surface, a ratio between a pole density of an orientation group consisting of {001}<1-10> to {001}<-1-10> and a pole density of an orientation group consisting of {111}<1-10> to {111}<-1-12> is less than 2.0.

(2) The steel sheet for hot stamping according to (1) may further contain, as the chemical composition, by mass %, one or more of the group consisting of
Nb: 0.05% to 0.15%,
TI: 0.05% to 0.15%,
V: 0.05% to 0.15%, Mo: 0.05% to 1.0%,
Cr: 0.05% to 1.0%,
Cu: 0.05% to 1.0%,
Ni: 0.05% to 1.0%,
B: 0.0001% to 0.0100%,
Ca: 0.001% to 0.010%, and
REM: 0.001% to 0.30%.

(3) The steel sheet for hot stamping according to (1) or (2), in which a decarburization index may be 0.085 or mom.

(4) A hot-stamping formed body according to another aspect of the present invention includes, as a chemical composition, by mass %:
C: 0.15 to 0.50%,
Si: 0.0010% to 3.000%,
Mn: 0.30% to 3.00%,
Al: 0.0002% to 2.000%,
P: 0.100% or less,
S: 0.1000% or less,
N: 0.0100% or less,
Nb: 0% to 0.15%,
Ti: 0% to 0.15%,
V: 0% to 0.15%,
Mo: 0% to 1.0%,
Cr: 0% to 1.0%,
Cu: 0% to 1.0%,
Ni: 0% to 1.0%,
B: 0% to 0.0100%,
Ca: 0% to 0.010%,
REM: 0% to 0.30%, and
a remainder consisting of Fe and an impurity,
in which the hot-stamping formed body has a metallographic structure containing, by area ratio, a total of 90% or more of martensite, bainite, and tempered martensite,
in a texture between a surface and a sheet thickness ¼ position from the surface, a ratio between a pole density of an orientation group consisting of {001}<1-10> to {001}<-1-10> and a pole density of an orientation group consisting of {111}<1-10> to {111}<-1-12> is less than 1.8, and
in a texture between the sheet thickness ¼ position from the surface and a sheet thickness ½ position from the surface, a ratio between a pole density of an orientation group consisting of {001}<1-10> to {001}<-1-10> and a pole density of an orientation group consisting of {111}<1-10> to {111}<-1-12> is less than 2.3.

(5) The hot-stamping formed body according to (4) may contain, as the chemical composition, by mass %, one or more of the group consisting of
Nb: 0.05% to 0.15%,
Ti: 0.05% to 0.15%,
V: 0.05% to 0.15%,
Mo: 0.05% to 1.0%,
Cr: 0.05% to 1.0%,
Cu: 0.05% to 1.0%.
Ni: 0.05% to 1.0%,
B: 0.0001% to 0.0100%,
Ca: 0.001% to 0.010%, and
REM: 0.001% to 0.30%.

(6) The hot-stamping formed body according to (4) or (5), in which a decarburization index may be 0.085 or more.

Effects of the Invention

According to the above-described aspects of the present invention, it is possible to provide a hot-stamping formed body having excellent strength and bendability and having high load capacity and a steel sheet for hot stamping enabling the obtainment of this hot-stamping formed body.

EMBODIMENTS OF THE INVENTION

The present inventors studied a method enabling not only for a tensile (maximum) strength of 1.5 to 2.5 GPa and excellent bendability to be obtained but also for the deterioration of the load capacity to be suppressed after hot stamping. As a result, the present inventors found that, in a hot-stamping formed body, when the surface layer of the steel sheet is softened, and furthermore, the texture at a predetermined position in the sheet thickness direction is controlled, it is possible to obtain a high strength and superior bendability than ever and to suppress the deterioration of the load capacity.

The texture is affected by the texture and the carbon concentration of the metallographic structure before hot stamping. Therefore, the present inventors found that, in order to obtain a desired texture in the hot-stamping formed body, it is effective to control the texture in the steel sheet body after hot rolling and, furthermore, to reduce the amount of carbon in the surface layer of the steel sheet during the subsequent annealing.

Hereinafter, the steel sheet for hot stamping and the hot-stamping formed body according to the present embodiment will be described in detail. First, the reason why the chemical composition of the steel sheet for hot stamping according to this embodiment is to be limited will be described.

Numerical limiting ranges expressed below using "to" include the lower limit and the upper limit in the ranges. Numerical values expressed with 'more than' and 'less than' are not included in numerical ranges. Regarding the chemical composition, "%" indicates "mass %" in all cases.

The steel sheet for hot stamping according to the present embodiment contains, as a chemical composition, mass %, C: 0.15% to 0.50%, Si: 0.0010% to 3.000%, Mn: 0.30% to 3.00%, Al: 0.0002% to 2.000%, P: 0.100% or less, S: 0.1000% or less, N: 0.0100% or less, Nb: 0% to 0.15%. Ti: 0% to 0.15%, V: 0% to 0.15%. Mo: 0% to 1.0%, Cr: 0% to 1.0%, Cu: 0% to 1.0%, Ni: 0% to 1.0%, B: 0% to 0.0100%, Ca: 0% to 0.010%, REM: 0% to 0.30%, and a remainder consisting of Fe and an impurity.

Hereinafter, each element will be described.

C: 0.15% to 0.50%

C is an element that improves the strength of the hot-stamping formed body. In a case where the C content is less than 0.15%, the desired strength of the hot-stamping formed body cannot be obtained. For this reason, the C content is set to 0.15% or more. The C content is preferably 0.17% or more, 0.20% or more, or 0.23% or more. On the other hand, when the C content is more than 0.50%, it is not possible to obtain excellent bendability. For this reason, the C content is set to 0.50% or less. The C content is preferably 0.46% or less or 0.43% or less.

Si: 0.0010% to 3.000%

Si is an element that improves the strength of the hot-stamping formed body by solid solution strengthening. When the Si content is less than 0.0010%, it is not possible to obtain a desired strength. For this reason, the Si content is set to 0.0010% or more. The Si content is preferably 0.050% or more, 0.100% or more, 0.300% or more, or 0.500% or more. On the other hand, when the Si content is more than 3.000%, the amount of ferrite increases, and it is not possible to obtain a desired metallographic structure. For this reason, the Si content is set to 3.000% or less. The Si content is preferably 2.700% or less or 2.500% or less.

Mn: 0.30% to 3.00%

Mn is an element that improves the hardenability of steel. In order to improve the hardenability and thereby obtain a desired amount of martensite after hot stamping, the Mn content is set to 0.30% or more. The Mn content is preferably 0.50% or more, 0.70% or more, or 1.00% or more. On the other hand, when the Mn content is more than 3.00%, cracking attributed to Mn segregation is likely to occur, and it is not possible to obtain excellent bendability. For this reason, the Mn content is set to 3.00% or less. The Mn content is preferably 2.70% or less, 2.50% or less, or 2.30% or less.

Al: 0.0002% to 2.000%

Al is an element that improves the distortion capability by deoxidizing molten steel to suppress the formation of oxide serving as the origin of fracture and improves the bendability of the hot-stamping formed body. When the Al content is less than 0.0002%, deoxidation is not sufficiently performed, and a coarse oxide is formed, which makes it impossible to obtain the above-mentioned effect. For this reason, the Al content is set to 0.0002% or more. The Al content is preferably 0.001% or more. On the other hand, when the Al content exceeds 2.000%, a coarse oxide is formed in steel, and the bendability of the hot-stamping formed body deteriorates. For this reason, the Al content is set to 2.000% or less. The Al content is preferably 1.700% or less or 1.500% or less.

P: 0.100% or Less

P is an impurity element and serves as the origin of fracture by being segregated at a grain boundary. For this reason, the P content is limited to 0.100% or less. The P content is preferably 0.050% or less. The lower limit of the P content is not particularly limited, but reduction of the P content to less than 0.0001% significantly increases the dephosphorization cost, which is not preferable economically. For this reason, the P content may be set to 0.0001% or more.

S: 0.1000% or Less

S is an impurity element and forms an inclusion in steel. Since this inclusion serves as the origin of fracture, the S content is limited to 0.1000% or less. The S content is preferably 0.0500% or less or 0.0300% or less. The lower limit of the S content is not particularly limited, but reduction of the S content to less than 0.0001% significantly increases the desulfurization cost, which is not preferable economically. For this reason, the S content may be set to 0.0001% or more.

N: 0.0100% or Less

N is an impurity element and forms nitride in steel. Since this nitride serves as the origin of fracture, the N content is limited to 0.0100% or less. The N content is preferably 0.0050% or less. The lower limit of the N content is not particularly limited, but reduction of the N content to less than 0.0001% significantly increases the denitrification cost, which is not preferable economically. For this reason, the N content may be set to 0.0001% or more.

The remainder of the chemical composition of the steel sheet for hot stamping according to this embodiment may be Fe and impurities. Elements, which are unavoidably mixed from a steel raw material or scrap and/or during the manufacture of steel and are allowed in a range where the characteristics of the steel sheet for hot stamping according to this embodiment do not deteriorate, are exemplary examples of the impurities.

The steel sheet for hot stamping according to this embodiment may contain the following elements as arbitrary elements instead of a part of Fe. The contents of the following arbitrary elements, which are obtained in a case where the following arbitrary elements are not contained, are 0%.

Nb: 0% to 0.15%
Ti: 0% to 0.15%
V: 0% to 0.15%

Nb and Ti have an effect on improvement in the strength of the hot-stamping formed body by precipitation hardening by forming a carbonitride in steel. In order to reliably exhibit this effect, the content of even one of Nb, Ti, and V is preferably set to 0.05% or more. On the other hand, in a case where the content of even one of Nb, Ti, and V is set to more than 0.15%, a large amount of a carbonitride is formed in steel, and the ductility of the hot-stamping formed body deteriorates. Therefore, the Nb content, Ti content, and V content are each set to 0.15% or less.

Mo: 0% to 1.0%
Cr: 0% to 1.0%
Cu: 0% to 1.0%
Ni: 0% to 1.0%

Mo and Cr have an action of increasing the strength of the hot-stamping formed body by forming a solid solution in prior austenite grains during heating before hot stamping. In order to reliably obtain this effect, the content of even one of Mo, Cr, Cu, and Ni is preferably set to 0.05% or more. On the other hand, since the effect is saturated even when a large amount of Mo, Cr, Cu, and Ni are contained, the Mo content, the Cr content, the Cu content, and the Ni content are each preferably set to 1.0% or less.

B: 0% to 0.0100%

B is an element that improves the hardenability of steel. In order to reliably obtain this effect, the B content is preferably set to 0.0001% or more. On the other hand, even when the B content is set to more than 0.0100%, the effect on improvement in the hardenability is saturated. For this reason, the B content is set to 0.0100% or less.

Ca: 0% to 0.010%
REM: 0% to 0.30%

Ca and REM are elements that improves the distortion capability by suppressing the formation of an oxide serving as the origin of fracture and improves the bendability of the hot-stamping formed body. In order to reliably obtain this effect, the content of even one of Ca and REM is preferably set to 0.001% or more. On the other hand, since the effect is saturated even when a large amount of Ca and REM are contained, the Ca content is set to 0.010% or less, and the REM content is set to 0.30% or less.

In this embodiment, REM refers to a total of 17 elements that are composed of Sc, Y, and lanthanoid and the REM content refers to the total content of these elements.

The above-mentioned chemical composition of the steel sheet for hot stamping may be measured by an ordinary analysis method. For example, the chemical composition of the above-mentioned hot-stamping formed body may be measured using inductively coupled plasma-atomic emission spectrometry (ICP-AES). C and S may be measured using a combustion-infrared absorption method and N may be measured using an inert gas fusion-thermal conductivity method. In a case where a plating layer is provided on the surface of the steel sheet for hot stamping, the chemical composition may be analyzed after the plating layer is removed by mechanical grinding.

Next, the metallographic structure of the steel sheet for hot stamping according to the present embodiment will be described.

The steel sheet for hot stamping according to the present embodiment has a metallographic structure consisting of, by area ratio, a total of 20% to 80% of ferrite, granular bainite, bainite, and martensite and the remainder in microstructure consisting of pearlite and a carbide. Regarding the metallographic structure to be described below, "%" indicates "area %" in all cases.

Ferrite, Granular Bainite, Bainite, and Martensite: 20% to 80%

Ferrite, granular bainite, bainite, and martensite are necessary structures to obtain a desired texture in a hot-stamping formed body. When the total area ratio of these structures is less than 20%, it is not possible to obtain a desired texture in the hot-stamping formed body. For this reason, the area ratio of the ferrite is set to 20% or more. The area ratio of the ferrite is preferably 30% or more or 40% or more. On the other hand, when the area ratio of these structures is more than 80%, carbon is concentrated in pearlite, which is the remainder, it becomes difficult for a carbide to dissolve during hot stamp heating, and the carbide serves as the origin of cracking during distortion. Therefore, the area ratio is set to 80% or less. The area ratio is preferably 70% or less or 60% or less.

Remainder in Microstructure: Pearlite and Carbide

The remainder in microstructure of the metallographic structure of the steel sheet for hot stamping consists of pearlite and a carbide. In the metallographic structure of the steel sheet for hot stamping, structures other than the above-mentioned structure, pearlite, and the carbide are not contained, the area ratio of the remainder in microstructure may be set to 20% to 80%.

Measurement Method of Metallographic Structure of Steel Sheet for Hot Stamping

A sample is cut out from an arbitrary position away from an end surface of the steel sheet for hot stamping by a distance of 50 mm or more (a position that avoids an end portion in a case where the sample cannot be collected at this position) so that a sheet thickness-cross section parallel to a rolling direction can be observed. The size of the sample also depends on a measurement device, but is set to a size that can be observed by about 10 mm in the rolling direction.

After being polished using silicon carbide paper having a grit of #600 to #1500, the cross section of the sample is finished as a mirror surface using liquid in which diamond powder having a grain size in the range of 1 μm to 6 μm is dispersed in diluted solution of alcohol or the like or pure water and finish-polished using a colloidal silica solution. Next, analysis is performed in a region that has a length of 50 μm and is present between a depth corresponding to 1/8 of the sheet thickness from the surface and a depth corresponding to 3/8 of the sheet thickness from the surface at an arbitrary position on the cross section of the sample in a longitudinal direction at an analysis rate of 200 to 300 points/second using an EBSD analyzer including a schottky emission scanning electron microscope (JSM-7001F manufactured by JEOL Ltd.) and an EBSD detector (DVC 5-type detector manufactured by TSL Solutions). The area ratio of a region where the crystal structure is bcc is calculated using a "Phase Map" function installed in software "OIM Analysis (registered trademark)" included in an EBSD analyzer, whereby the total area ratio of the ferrite, the granular bainite, the bainite, and the martensite can be obtained.

The pearlite and the carbide can be identified by the following method. After being polished using silicon carbide paper having a grit of #600 to #1500, the cross section of the sample is finished as a mirror surface using liquid in which diamond powder having a grain size in the range of 1 μm to 6 μm is dispersed in diluted solution of alcohol or the like or pure water and Nital etching is performed. Then, photographs having a plurality of visual fields are taken using a schottky emission scanning electron microscope (JSM-7001F manufactured by JEOL Ltd.) in a region that has a length of 50 μm and is present between a depth corresponding to 1/8 of the sheet thickness from the surface and a depth corresponding to 3/8 of the sheet thickness from the surface at an arbitrary position on the cross section of the sample in a longitudinal direction. Evenly spaced grids are drawn in the taken photographs, and structures at grid points are identified. The number of grid points corresponding to each structure is obtained and is divided by the total number of grid points, so that the area ratio of each structure is obtained. The area ratio can be more accurately obtained as the total number of grid points is larger. In this embodiment, grid spacings are set to 2 μm×2 μm and the total number of grid points is set to 1500. Particles with bright brightness are regarded as the carbide, and a region where regions with bright brightness are disposed in a granular or sheet shape and in a lamellar shape is regarded as the pearlite.

Next, the texture of the steel sheet for hot stamping according to the present embodiment will be described.

In the steel sheet for hot stamping according to the present embodiment, the ratio between the pole density of the orientation group consisting of {001}<1-10> to {001}<-1-10> and the pole density of the orientation group consisting of {111}<1-10> to {111}<-1-12> is less than 1.5 in the texture between the surface and the sheet thickness 1/4 position from the surface, and the ratio between the pole density of the orientation group consisting of {001}<1-10> to {001}<-1-10> and the pole density of the orientation group consisting of {111}<1-10> to {111}<-1-12> is less than 2.0 in the texture between the sheet thickness 1/4 position from the surface and the sheet thickness 1/2 position from the surface.

The orientation group consisting of {001}<1-10> to {001}<-1-10> includes crystal orientations of {001}<1-10>, {001}<1-20>, {001}<0-10>, and {001}<-1-10>. The orientation group consisting of {111}<1-10> to {111}<-1-12> includes crystal orientations of {111}<1-10>, {111}<1-21>, {111}<0-11>, and {111}<-1-12>.

Texture between surface and sheet thickness 1/4 position from surface: Ratio between pole density of orientation group consisting of {001}<1-10> to {001}<-1-10> and pole density of orientation group consisting of {111}<1-10> to {111}<-1-12> being less than 1.5

In the texture between the surface and the sheet thickness 1/4 position from the surface (hereinafter, referred to as the surface layer region in some cases), the ratio between the pole density of the orientation group consisting of {001}<1-10> to {001}<-1-10> and the pole density of the orientation group consisting of {111}<1-10> to {111}<-1-12> is set to less than 1.5.

When the texture in the surface layer region of the steel sheet for hot stamping is preferably controlled, it is possible to suppress carbon recuperation in the surface layer region (diffusion of carbon from the inside region into the surface layer region having a low C concentration) during heating for hot stamping, and, when a texture that easily relaxes strain introduced by bending distortion in the surface layer region where energy attributed to distortion is absorbed such as a vicinity of the surface of the steel sheet is developed, it is possible to obtain a steel sheet for hot stamping having excellent bendability after hot stamping.

When the ratio between the pole density of the orientation group consisting of {001}<1-10> to {001}<-1-10> and the pole density of the orientation group consisting of {111}<1-10> to {111}<−1-12> of the texture in the surface layer region is 1.5 or more, the above-mentioned effect cannot be obtained. Therefore, the ratio between the pole density of the orientation group consisting of {001}<1-10> to {001}<−1-10> and the pole density of the orientation group consisting of {111}<1-10> to {111}<−1-12> of the texture in the surface layer region is set to less than 1.5. The ratio is preferably less than 1.2.

The ratio between the pole density of the orientation group consisting of {001}<1-10> to {001}<−1-10> and the pole density of the orientation group consisting of {111}<1-10> to {111}<−1-12> of the texture in the surface layer region may be set to 0.4 or more from the viewpoint of ensuring the strength of the hot-stamping formed body.

Texture between sheet thickness ¼ position from surface and sheet thickness ½ position from surface: Ratio between pole density of orientation group consisting of {001}<1-10> to {001}<−1-10> and pole density of orientation group consisting of {111}<1-10> to {111}<−1-12> being less than 2.0

In the texture between the sheet thickness ¼ position from the surface and the sheet thickness ½ position from surface (hereinafter, referred to as the inside region in some cases), the ratio between the pole density of the orientation group consisting of {001}<1-10> to {001}<−1-10> and the pole density of the orientation group consisting of {111}<1-10> to {111}<−1-12> is set to less than 2.0.

When the texture in the inside region of the steel sheet for hot stamping is preferably controlled, it is possible to develop a texture including grain boundaries that do not easily fracture in a region that withstands a load such as the vicinity of the inside of the steel sheet and also to improve the load capacity while maintaining excellent bendability. When the ratio between the pole density of the orientation group consisting of {001}<1-10> to {001}<−1-10> and the pole density of the orientation group consisting of {111}<1-10> to {111}<−1-12> of the texture in the inside region is 2.0 or more, the above-mentioned effect cannot be obtained. Therefore, the ratio between the pole density of the orientation group consisting of {001}<1-10> to {001}<−1-10> and the pole density of the orientation group consisting of {111}<1-10> to {111}<−1-12> of the texture in the inside region is set to less than 2.0. The ratio is preferably less than 1.6.

The ratio between the pole density of the orientation group consisting of {001}<1-10> to {001}<−1-10> and the pole density of the orientation group consisting of {111}<1-10> to {111}<−1-12> of the texture in the inside region may be set to 0.4 or more from the viewpoint of ensuring the toughness.

Measurement Method of Pole Density

The pole densities of the surface layer region and the inside region are measured by the following method.

The pole densities of the surface layer region and the inside region can be obtained from an orientation distribution function (ODF) that displays a three-dimensional texture calculated by computing, using spherical harmonics, an orientation data measured by an electron backscattering diffraction (EBSD) method using a device in which a scanning electron microscope and an EBSD analyzer are combined and OIM Analysis (registered trademark) manufactured by TSL Solutions.

The measurement ranges are a region between the surface and the sheet thickness ¼ position from the surface (a region between the surface as the start point and the sheet thickness ¼ position in the sheet thickness direction from the surface as the end point) for the surface layer region and a region between the sheet thickness ¼ position from the surface and the sheet thickness ½ position from the surface (a region between the sheet thickness ¼ position in the sheet thickness direction from the surface as the start point and the sheet thickness ½ position in the sheet thickness direction from the surface as the end point) for the inside region. The measurement pitches are set to 5 μm/step.

A value obtained by dividing the average value of the pole densities of the orientation group consisting of {001}<1-10> to {001}<−1-10> by the average value of the pole densities of the orientation group consisting of {111}<1-10> to {111}<−1-12> is regarded as the ratio between the pole density of the orientation group consisting of {001}<1-10> to {001}<−1-10> and the pole density of the orientation group consisting of {111}<1-10> to {111}<−1-12>.

It should be noted that {hkl} indicates a crystal plane parallel to a rolled surface and <uvw> indicates a crystal direction parallel to a rolling direction. That is, {hkl}<uvw> indicates a crystal in which {hkl} is oriented in the sheet surface normal direction and <uvw> is oriented in the rolling direction.

The steel sheet for hot stamping according to the present embodiment may have a plating layer on a surface. The plating layer provided on the surface makes it possible to improve the corrosion resistance after hot stamping. As the plating layer, an aluminum plating layer, an aluminum-zinc plating layer, an aluminum-silicon plating layer, a hot-dip galvanized layer, an electrogalvanized layer, a hot-dip galvannealed layer, or the like is an exemplary example.

Decarburization Index of Steel Sheet for Hot Stamping being 0.085 or More

When the decarburization index of the steel sheet for hot stamping is preferably controlled, it is possible to promote the development of the texture including grain boundaries that do not easily fracture in a region that withstands a load such as the vicinity of the inside of the steel sheet and also to improve the load capacity while maintaining excellent bendability. The decarburization index is preferably 0.140 or more and more preferably 0.180 or more. Due to the calculation method of the decarburization index, the upper limit becomes 1.000.

Measurement Method of Decarburization Index

The decarburization index is an index that quantifies the amount of carbon reduced in the surface layer of the steel sheet and can be calculated by the following method. An element concentration distribution in the sheet thickness direction in the steel sheet for hot stamping is measured using a glow discharge optical emission spectrometry (GD-OES). Here, the measurement range is set to a depth of 200 μm from the outermost surface of the steel sheet, and the measurement intervals are set to 0.02 μm or less. All elements that are contained in the steel sheet for hot stamping are measured.

For steel sheets having a plating layer, a coating film, or the like on the surface, a part or all of the plating layer, coating, or the like is removed by mechanical polishing or chemical polishing such that measurement becomes possible up to a position 200 μm deep from the outermost surface of the steel sheet, and GD-OES measurement is performed. In the GD-OES measurement, a region where the iron concentration becomes 90 mass % or more is determined as the steel sheet, and a measurement point where the iron concentration becomes 90 mass % is defined as the outermost surface position of the steel sheet.

Next, the average value of the measurement values (1000 points or more) of the carbon concentration from the outermost surface position of the steel sheet to a depth of 180 µm to a depth of 200 µm is calculated, and this average value is regarded as the carbon concentration of the steel sheet base metal.

Alternatively, regarding the measurement value of the carbon concentration in a 20 µm region from the deepest portion toward the surface layer, in a case where the absolute value of the difference between the average value of the carbon concentrations in the 20 µm regions from the deepest portion toward the surface layer and the maximum value of the measurement values of the carbon concentrations in the 20 µm regions from the deepest portion toward the surface layer is 0.1% or less, and the absolute value of the difference between the average value of the carbon concentrations in the 20 µm regions from the deepest portion toward the surface layer and the minimum value of the measurement values of the carbon concentrations in the 20 µm regions from the deepest portion toward the surface layer is 0.1% or less, the average value of the carbon concentrations in the 20 µm regions from the deepest portion toward the surface layer may be regarded as the carbon concentration of the steel sheet base metal.

The unit depth is 20 µm, and the deepest portion refers to each deep position in a case where positions are marked every unit depth from the outermost surface position of the steel sheet to a depth position of 200 µm. For example, in a case where the deepest portion is 120 µm, "the measurement value of the carbon concentration in the 20 µm region from the deepest portion toward the surface layer" means the carbon concentration at a measurement point that is included between the 100 µm position and the 120 µm position.

The amount of the carbon concentration decreased per unit depth (a value obtained by subtracting the carbon concentration at each measurement point from the carbon concentration of the base metal) is calculated from the outermost surface position of the steel sheet to the depth position of 200 µm, and the integrated value of the product of the unit depth and the amount of the carbon concentration decreased is obtained and regarded as the area of a carbon deficient region (area A). Next, the product of the carbon concentration of the base metal and 200 µm is regarded as a reference area (area B), and a value obtained by dividing the carbon deficient area (area A) by the reference area (area B) is regarded as the decarburization index.

Next, a hot-stamping formed body that can be obtained by applying a manufacturing method to be described below to the above-described steel sheet for hot stamping will be described. In the hot-stamping formed body according to the present embodiment, the texture is changed between the surface layer region and the inside region, whereby the distortion capability of the metallographic structure in the surface layer region is improved, and the load capacity of the inside is enhanced. The chemical composition of the hot-stamping formed body according to the present embodiment is the same as the chemical composition of the above-described steel sheet for hot stamping and thus will not be described again.

The hot-stamping formed body according to the present embodiment has a metallographic structure including, by area ratio, a total of 90% or more of martensite, bainite, and tempered martensite, the ratio between the pole density of the orientation group consisting of $\{001\}<1\text{-}10>$ to $\{001\}<-1\text{-}10>$ and the pole density of the orientation group consisting of $\{111\}<1\text{-}10>$ to $\{111\}<-1\text{-}12>$ is less than 1.8 in the texture between the surface and the sheet thickness ¼ position from the surface, and the ratio between the pole density of the orientation group consisting of $\{001\}<1\text{-}10>$ to $\{001\}<-1\text{-}10>$ and the pole density of the orientation group consisting of $\{111\}<1\text{-}10>$ to $\{111\}<-1\text{-}12>$ is less than 2.3 in the texture between the sheet thickness ¼ position from the surface and the sheet thickness ½ position from the surface. Regarding the metallographic structure to be described below, "%" indicates "area %" in all cases.

Martensite, Bainite, and Tempered Martensite: Total of 90% or More

Martensite, bainite, and tempered martensite are structures necessary to obtain a desired strength. When the total area ratio of martensite, bainite, and tempered martensite is less than 90%, a desired strength cannot be obtained. For this reason, the area ratio of martensite, bainite, and tempered martensite is set to 90% or more in total. The area ratio is preferably 93% or more or 95% or more. Since the area ratio of martensite, bainite, and tempered martensite is preferably as large as possible, the area ratio of martensite, bainite, and tempered martensite may be set to 100%.

In the present embodiment, two or more kinds of martensite, bainite, and tempered martensite may be contained in an area ratio of a total of 90% or more or one of martensite, bainite, or tempered martensite may be contained in an area ratio of 90% or more.

There is a case where the hot-stamping formed body according to the present embodiment includes one or more of ferrite and granular bainite as the remainder in microstructure. When the area ratio of these remainders in microstructure is more than 10%, a desired load capacity cannot be obtained. Therefore, the area ratio of the remainder in microstructure may be set to 10% or less. Since the area ratio of the remainder in microstructure is preferably as small as possible, the area ratio of the remainder in microstructure may be set to 7% or less, 5% or less, or 0%.

Measurement Method of Area Ratios of Martensite, Bainite, and Tempered Martensite The metallographic structure of the hot-stamping formed body according to the present embodiment is measured by the following method.

A sample is cut out from an arbitrary position away from an end surface of the hot-stamping formed body by a distance of 50 mm or more (a position that avoids an end portion in a case where the sample cannot be collected at this position) so that a sheet thickness-cross section parallel to a rolling direction can be observed. The size of the sample also depends on a measurement device, but is set to a size that can be observed by about 10 mm in the rolling direction.

After being polished using silicon carbide paper having a grit of #600 to #1500, the cross section of the sample is finished as a mirror surface using liquid in which diamond powder having a grain size in the range of 1 µm to 6 µm is dispersed in diluted solution of alcohol or the like or pure water. Then, the sample is polished for 8 minutes using colloidal silica not containing alkaline solution at a room temperature, and thus, strain introduced into the surface layer of the sample is removed. A region, which has a length of 50 µm and is present between a depth corresponding to ⅛ of the sheet thickness from the surface and a depth corresponding to ⅜ of the sheet thickness from the surface, is measured at a measurement interval of 0.1 µm at an arbitrary position on the cross section of the sample in a longitudinal direction by an electron backscatter diffraction method, and thus, crystal orientation information is obtained. An EBSD analyzer formed of a schottky emission scanning electron microscope (JSM-7001F manufactured by JEOL Ltd.) and an EBSD detector (DVC 5-type detector manufactured by TSL Solutions) is used for measurement. In this case, the degree of vacuum in the EBSD analyzer is set to $9.6\times10$ Pa or less, an accelerating voltage is set to 15 kV, an irradiation current level is set to 13, and the irradiation level of an electron beam is set to 62.

A region where the crystal structure is bcc is specified using the obtained crystal orientation information and "Phase Map" function of software "OIM Analysis (registered trademark)" included in an EBSD analyzer. Regions where the crystal structure is bcc are determined as bainite, tempered martensite, martensite, granular bainite, and ferrite. In these regions, regions where a grain average misorientation value is more than 3.0° are determined as martensite, bainite, and tempered martensite using "Grain Average Misorientation" function of software "OIM Analysis (registered trademark)" included in the EBSD analyzer, and the total of these area ratios is calculated, thereby obtaining the total of the area ratios of "martensite, bainite, and tempered martensite".

The area ratio of the remainder in microstructure may be obtained by subtracting the total of the area ratios of "martensite, bainite, and tempered martensite" from 100%.

Texture between surface and sheet thickness ¼ position from surface: Ratio between pole density of orientation group consisting of {001}<1-10> to {001}<-1-10> and pole density of orientation group consisting of {111}<1-10> to {111}<-1-12> being less than 1.8

In the texture between the surface and the sheet thickness ¼ position from the surface (surface layer region), when the ratio between the pole density of the orientation group consisting of {001}<1-10> to {001}<-1-10> and the pole density of the orientation group consisting of {111}<1-10> to {111}<-1-12> is set to less than 1.8, the bendability can be improved. Therefore, in the texture of the surface layer region, the ratio between the pole density of the orientation group consisting of {001}<1-10> to {001}<-1-10> and the pole density of the orientation group consisting of {111}<1-10> to {111}<-1-12> is set to less than 1.8. The ratio is preferably less than 1.7 or less than 1.6.

The ratio between the pole density of the orientation group consisting of {001}<1-10> to {001}<-1-10> and the pole density of the orientation group consisting of {111}<1-10> to {111}<-1-12> of the texture of the surface layer region may be set to 0.4 or more from the viewpoint of ensuring the strength.

Texture between sheet thickness ¼ position from surface and sheet thickness ½ position from surface: Ratio between pole density of orientation group consisting of {001}<1-10> to {001}<-1-10> and pole density of orientation group consisting of {111}<1-10> to {111}<-1-12> being less than 2.3

In the texture between the sheet thickness ¼ position from the surface and the sheet thickness ½ position from the surface (inside region), when the ratio between the pole density of the orientation group consisting of {001}<1-10> to {001}<-1-10> and the pole density of the orientation group consisting of {111}<1-10> to {111}<-1-12> is set to less than 2.3, a high load capacity can be obtained. Therefore, in the texture of the inside region, the ratio between the pole density of the orientation group consisting of {001}<1-10> to {001}<-1-10> and the pole density of the orientation group consisting of {111}<1-10> to {111}<-1-12> is set to less than 2.3. The ratio is preferably less than 2.2 or less than 2.1.

The ratio between the pole density of the orientation group consisting of {001}<1-10> to {001}<-1-10> and the pole density of the orientation group consisting of {111}<1-10> to {111}<-1-12> of the texture of the inside region may be set to 0.4 or more from the viewpoint of ensuring the toughness.

The pole densities of the surface layer region and the inside region may be measured by the same method as that for the steel sheet for hot stamping. However, the rolling direction in the hot-stamping formed body may be determined by the following method.

First, a test piece is collected such that the sheet thickness cross section of the hot-stamping formed body can be observed. The sheet thickness cross section of the collected test piece is finished by mirror polishing and then observed using an optical microscope. The observation range is set to the overall thickness of the sheet thickness, and a region where the brightness is dark is determined as an inclusion. Among inclusions, in inclusions having a major axis length of 40 μm or more, a direction parallel to a direction where the inclusion extends is determined as the rolling direction.

The hot-stamping formed body according to the present embodiment may have a plating layer on a surface. The plating layer provided on the surface makes it possible to improve the corrosion resistance. As the plating layer, an aluminum plating layer, an aluminum-zinc plating layer, an aluminum-silicon plating layer, a hot-dip galvanized layer, an electrogalvanized layer, a hot-dip galvannealed layer, or the like is an exemplary example.

Decarburization Index of Hot-Stamping Formed Body being 0.085 or More

When the decarburization index of the hot-stamping formed body is preferably controlled, it is possible to promote the development of the texture including grain boundaries that do not easily fracture in a region that withstands a load such as the vicinity of the inside of the steel sheet and also to improve the load capacity while maintaining excellent bendability. The decarburization index is preferably 0.140 or more and more preferably 0.180 or more. Due to the calculation method of the decarburization index, the upper limit of the decarburization index becomes 1.000; however, in order to improve the load capacity as well while maintaining excellent bendability, the upper limit is preferably 0.500 or less and more preferably 0.040 or less.

The decarburization index of the hot-stamping formed body may be measured by the same method as that for the steel sheet for hot stamping.

Manufacturing Method of Steel Sheet for Hot Stamping

Hereinafter, a preferable manufacturing method of the steel sheet for hot stamping according to the present embodiment will be described.

First, it is preferable that a cast piece is heated to 1200° C. or higher and held for 20 minutes or longer and then, in a hot rolling process, a rolling which is 1 pass before a final rolling is performed in a temperature range of 850° C. to 900° C. at a rolling reduction of 8% to 30%. Next, the hot rolling is preferably completed in a temperature range of 800° C. or higher and lower than 850° C. at a rolling reduction of 6% to 12%. That is, the final rolling of the hot rolling is preferably performed in a temperature range of 800° C. or higher and lower than 850° C. at a rolling reduction of 6% to 12%.

It is preferable that, after 2.5 seconds or longer elapses from the end of the hot rolling, cooling is performed at an average cooling rate in a temperature range from the hot rolling end temperature to 450° C. of slower than 10° C./s. After that, the hot-rolled steel sheet is preferably coiled in a temperature range of 700° C. or lower. Furthermore, it is preferable that decarburization annealing is performed, thereby manufacturing a steel sheet for hot stamping having the above-described chemical composition.

The present inventors found that a texture that improves the bending distortion capability and the load capacity after hot stamping develops by transformation from austenite including a small amount of dislocation into ferrite or granular bainite. Therefore, when the rolling one pass before the final rolling is performed at lower than 850° C. or performed at a rolling reduction of larger than 30%, there is a case where the cast piece is finally rolled while the dislocation of austenite before transformation remains unrecovered, transformation from austenite including the dislocation to ferrite occurs, and the development of a desired texture is impaired.

On the other hand, when the rolling one pass before the final rolling is performed at higher than 900° C. or performed at a rolling reduction of smaller than 8%, there is a case where the recovery of dislocation is excessively promoted, the dislocation density in austenite becomes too low, and a desired texture cannot be obtained.

Therefore, the rolling one pass before the final rolling in the hot rolling is preferably performed in a temperature range of 850° C. to 900° C. at a rolling reduction of 8% to 30%.

When the final rolling is performed at lower than 800° C. or performed at a rolling reduction of larger than 12%, there is a case where the cast piece is finally rolled while the dislocation of austenite before transformation remains unrecovered, transformation from austenite including the dislocation to ferrite occurs, and the development of a desired texture is impaired.

On the other hand, when the final rolling is performed at 850° C. or higher or performed at a rolling reduction of smaller than 6%, there is a case where the recovery of dislocation is excessively promoted, and thus the dislocation density in austenite becomes too low, and a desired texture cannot be obtained.

Therefore, the final rolling of the hot rolling is preferably performed in a temperature range of 800° C. or higher and lower than 850° C. at a rolling reduction of 6% to 12%.

It is preferable to start cooling after 2.5 seconds or longer elapses from the end of the hot rolling. When a time of 2.5 seconds or longer is ensured before the start of the cooling, phase transformation to ferrite or granular bainite is promoted, and a desired texture can be sufficiently developed. When the elapsed time is shorter than 2.5 seconds, there is a case where a desired texture cannot be obtained.

After 2.5 seconds or longer elapses from the completion of the hot rolling, when the average cooling rate in a temperature range from the hot rolling end temperature to 450° C. is set to slower than 10° C./s, phase transformation to ferrite or granular bainite is promoted, and a desired texture can be sufficiently developed. When the average cooling rate in the above-described temperature range is 10° C./s or faster, there is a case where a desired texture cannot be obtained.

The average cooling rate mentioned herein is defined as a value obtained by dividing a temperature difference between the start point and the end point of a set range by the elapsed time from the start point to the end point.

When the coiling temperature is higher than 700° C., there is a case where the recovery of dislocation is excessively promoted and a desired texture does not develop. Therefore, the coiling temperature is preferably set to 700° C. or lower.

The steel sheet for hot stamping is obtained by the above method.

It is preferable to perform decarburization annealing on the steel sheet for hot stamping obtained by the above method. Before the decarburization annealing, a heat treatment for the purpose of softening may be performed as necessary, and furthermore, cold rolling may be performed at a cumulative rolling reduction (={1−(sheet thickness after cold rolling/sheet thickness before cold rolling)}×100) of 30% to 70%. Plating may be performed in a decarburization annealing line or an annealing line for plating may be threaded again after the end of the decarburization annealing. As a plating layer that is imparted to the surface of the steel sheet for hot stamping, an aluminum plating layer, an aluminum-zinc plating layer, an aluminum-silicon plating layer, a hot-dip galvanized layer, an electrogalvanized layer, a hot-dip galvannealed layer, or the like is an exemplary example.

The decarburization annealing reduces the amount of C in the surface layer region of the steel sheet for hot stamping. As the conditions of the decarburization annealing, it is preferable that the atmosphere is set to a moist atmosphere containing hydrogen, nitrogen, or oxygen, the decarburization annealing temperature (the maximum attainment temperature of the steel sheet) is set to 700° C. to 950° C., and the residence time in the temperature range of 700° C. to 950° C. is set to 5 seconds to 1200 seconds. The residence time mentioned herein refer to a time from when the steel sheet temperature rises and reaches 700° C. to when the steel sheet temperature is held at 700° C. to 950° C., decreases and reaches 700° C.

When the maximum attainment temperature is lower than 700° C. and the residence time in the temperature range of 700° C. to 950° C. is shorter than 5 seconds, since the diffusion of C is not sufficiently promoted, there is a case where decarburization does not proceed and the texture of the surface layer region cannot be controlled. On the other hand, when the maximum attainment temperature is higher than 950° C. and the residence time in the temperature range of 700° C. to 950° C. is longer than 1200 seconds, there is a case where decarburization excessively proceeds and, in the texture of the surface layer region, the ratio between the pole density of the orientation group consisting of {001}<1-10> to {001}<−1-10> and the pole density of the orientation group consisting of {111}<1-10> to {111}<−1-12> cannot be controlled to less than 1.5.

Next, a preferable manufacturing method of the hot-stamping formed body according to the present embodiment using the steel sheet for hot stamping according to the present embodiment will be described. The hot-stamping formed body according to the present embodiment can be obtained by hot-stamping the steel sheet for hot stamping manufactured by the above-described method in a high temperature range.

First, it is preferable that the steel sheet for hot stamping is heated and held in a temperature range of 800° C. to 1000° C. for 60 to 600 seconds. An average heating rate during the heating may be set to 0.1° C./s or faster or 200° C./s or slower. The average heating rate mentioned here is a value that is obtained in a case where a temperature difference between the surface temperature of a steel sheet at the time of start of the heating and a holding temperature is divided by a time difference from the start of the heating to a time when a temperature reaches a holding temperature. In addition, during the holding, the temperature of a steel sheet may be fluctuated in the temperature range of 800° C. to 1000° C. or may be constant.

When the heating temperature is lower than 800° C. and the holding time is shorter than 60 seconds, there is a case where the dissolution of a carbide becomes impure and the remaining carbide acts as a starting point of cracking to degrade the bendability. When the heating temperature is higher than 1000° C. and the holding time is longer than 600 seconds, there is a case where the diffusion of C is excessively promoted and the ratio between the pole density of the orientation group consisting of {001}<1-10> to {001}<-1-10> and the pole density of the orientation group consisting of {111}<1-10> to {111}<-1-12> of the texture of the inside region cannot be set to less than 2.3.

Exemplary examples of a heating method to be performed before the hot stamping include heating using an electric furnace, a gas furnace, or the like, flame heating, energization heating, high-frequency heating, induction heating, and the like.

After the steel sheet is held in the above-described temperature range, hot stamping is performed. In the manufacturing method of the hot-stamping formed body according to the present embodiment, forming is preferably performed in a temperature range of 650° C. or higher and lower than 1000° C. After the hot stamping, it is preferable to cool the steel sheet to a temperature range of 300° C. or lower at an average cooling rate of 10° C./s or faster.

In the manufacturing method of the hot-stamping formed body according to the present embodiment, when the forming temperature is lower than 650° C., there is a case where it is not possible to set the total area ratio of bainite, tempered martensite, and martensite to 90% and it is not possible to obtain a desired load capacity. When the forming is performed at 1000° C. or higher, in the texture of the inside region, there is a case where grain diameters become too large and it is not possible to control the ratio between the pole density of the orientation group consisting of {001}<1-10> to {001}<-1-10> and the pole density of the orientation group consisting of {111}<1-10> to {111}<-1-12> to less than 2.3.

The hot-stamping formed body is obtained by the above method. After the hot stamping, a tempering treatment may be performed at 150° C. to 600° C. In addition, a part of the hot-stamping formed body may be tempered by laser irradiation or the like to partially provide a softened region.

EXAMPLES

Next, examples of the present invention will be described. Conditions in the examples are examples of conditions adopted to confirm the feasibility and effect of the present invention, and the present invention is not limited to the examples of conditions. The present invention is capable of adopting a variety of conditions as long as the object of the present invention is achieved without departing from the gist of the present invention.

Steel pieces manufactured by casting molten steel having a chemical composition shown in Table 1-1 and Table 1-2 were held in a temperature range of 1200° C. or higher for 20 minutes or longer, and then hot rolling, cold rolling, and decarburization annealing were performed under conditions shown in Table 2-1 to Table 2-6. A softening heat treatment was performed before the decarburization annealing as necessary. In addition, plating and plating annealing were performed as necessary. Therefore, steel sheets for hot stamping shown in Table 3-1 to Table 3-3 were obtained.

Hot stamping was performed on the obtained steel sheet for hot stamping under conditions shown in Table 4-A-1 to Table 4-A-3, thereby obtaining hot-stamping formed bodies. On some of the hot-stamping formed bodies, a tempering treatment was performed at 150° C. to 600° C. after the hot stamping. In addition, for some of the hot-stamping formed bodies, the hot-stamping formed bodies were partially irradiated with a laser, thereby forming partially softened regions. Table 5-A-1 to Table 5-A-3 show the microstructures and mechanical properties of the obtained hot-stamping formed bodies.

Underlined values in the tables indicate that the values are outside the scope of the present invention, the preferred manufacturing conditions are not satisfied, or property values are not preferable. In addition, "pole density ratio in texture of surface layer region" in Table 5-A-1 to Table 5-A-3 indicates the ratio between the pole density of the orientation group consisting of {001}<1-10> to {001}<-1-10> and the pole density of the orientation group consisting of {111}<1-10> to {111}<-1-12> in the texture between the surface and the sheet thickness ¼ position from the surface, and "pole density ratio in texture of inside region" indicates the ratio between the pole density of the orientation group consisting of {001}<1-10> to {001}<-1-10> and the pole density of the orientation group consisting of {111}<1-10> to {111}<-1-12> in the texture between the sheet thickness ¼ position from the surface and the sheet thickness ½ position from the surface. "Increase amount (N/°)" in Table 5-A-1 to Table 5-A-3 indicates "the load increase amount per unit bending angle (N/°) in a region from immediately after the start of the test to a bending angle 20°)".

The metallographic structures and the textures of the steel sheet for hot stamping and the hot-stamping formed bodies were measured by the above-described measurement method. In addition, the mechanical properties of the hot-stamping formed body were evaluated by the following methods.

Tensile Strength and Uniform Elongation

The tensile (maximum) strength TS and uniform elongation uEl of the hot-stamping formed body were obtained by producing a No. 5 test piece from an arbitrary position of the hot-stamping formed body in accordance with JIS Z 2241: 2011 and performing a tensile test. The speed of a cross-head was set to 3 mm/min.

In a case where the tensile strength TS was 1500 MPa or more, the hot-stamping formed body was determined as acceptable for being excellent in terms of strength, and, in a case where the tensile strength TS was less than 1500 MPa, the hot-stamping formed body was determined as unacceptable for being poor in strength.

Bending Angle and Load Capacity

The bending angle was evaluated by the following method based on the VDA standard (VDA238-100) specified by Verband der Automobilindustrie. In the present examples, displacement under the maximum load that was obtained in a bending test was converted to an angle based on VDA, thereby obtaining the maximum bending angle α (°). In a case where the product (TS×α) of the tensile strength TS and the maximum bending angle α obtained by the above-described method was 75000 MPa·° or more, the hot-stamping formed body was determined as acceptable for being excellent in terms of bendability, and, in a case where the product was less than 75000 MPa·°, the hot-stamping formed body was determined as unacceptable for being poor in bendability.

The load capacity was evaluated with the load increase amount per unit bending angle in a region from immediately after the start of the test to a bending angle of 20° in a load stroke curve that is obtained in the bending test. In a case where the load increase amount per unit bending angle was 400 N/° or more, the hot-stamping formed body was determined as acceptable for being excellent in terms of the load capacity, and, in a case where the load increase amount per unit bending angle was less than 400 N/°, the hot-stamping formed body was determined as unacceptable for being poor in the load capacity.

The conditions in the bending test were as described below.
- Dimensions of test piece: 60 mm (rolling direction)×30 mm (a direction parallel to a sheet width direction)
- Test piece sheet thickness: 1.6 mm
- Bending ridge: A direction parallel to a sheet width direction
- Testing method: Supported by rolls and pressed by a punch
- Roll diameter: φ 30 mm
- Punch shape: Tip R=0.4 mm
- Distance between rolls: 2.0×sheet thickness (mm)+0.5 mm
- Pressing speed: 20 mm/min
- Tester: SHIMADZU AUTOGRAPH 20 kN From Table 5-A-1 to Table 5-A-3, it is found that the hot-stamping formed bodies that were the present invention examples had excellent strength and bendability and has a high load capacity.

On the other hand, it is found that the hot-stamping formed bodies that were the comparative examples were poor in one or more properties.

TABLE 1-1

| Steel No. | Chemical composition (mass %), remainder: Fe and impurity ||||||||||||||||| Note |
|---|---|---|---|---|---|---|---|---|---|---|---|---|---|---|---|---|---|---|
| | C | Si | Mn | Al | P | S | N | Nb | Ti | V | Mo | Cr | Cu | Ni | B | Ca | REM | |
| 1 | 0.12 | 0.200 | 1.60 | 0.026 | 0.010 | 0.0012 | 0.0056 | | | | | | | | | | | Comparative Steel |
| 2 | 0.21 | 0.130 | 1.20 | 0.026 | 0.012 | 0.0010 | 0.0081 | | | | | | | | | | | Present Invention Steel |
| 3 | 0.31 | 0.300 | 1.30 | 0.031 | 0.009 | 0.0036 | 0.0030 | | | | | | | | | | | Present Invention Steel |
| 4 | 0.36 | 0.200 | 1.40 | 0.030 | 0.015 | 0.0029 | 0.0047 | | | | | | | | | | | Present Invention Steel |
| 5 | 0.45 | 0.120 | 1.60 | 0.031 | 0.015 | 0.0025 | 0.0059 | | | | | | | | | | | Present Invention Steel |
| 6 | 0.51 | 0.210 | 1.70 | 0.040 | 0.013 | 0.0031 | 0.0086 | | | | | | | | | | | Comparative Steel |
| 7 | 0.18 | 0.0005 | 1.30 | 0.038 | 0.015 | 0.0026 | 0.0044 | | | | | | | | | | | Comparative Steel |
| 8 | 0.35 | 0.005 | 1.20 | 0.029 | 0.009 | 0.0011 | 0.0044 | | | | | | | | | | | Present Invention Steel |
| 9 | 0.35 | 0.200 | 1.00 | 0.027 | 0.011 | 0.0037 | 0.0094 | | | | | | | | | | | Present Invention Steel |
| 10 | 0.35 | 1.000 | 1.40 | 0.029 | 0.015 | 0.0019 | 0.0032 | | | | | | | | | | | Present Invention Steel |
| 11 | 0.35 | 3.200 | 1.60 | 0.033 | 0.015 | 0.0018 | 0.0095 | | | | | | | | | | | Comparative Steel |
| 12 | 0.35 | 0.240 | 0.20 | 0.028 | 0.014 | 0.0015 | 0.0098 | | | | | | | | | | | Comparative Steel |
| 13 | 0.35 | 0.220 | 0.50 | 0.039 | 0.012 | 0.0015 | 0.0086 | | | | | | | | | | | Present Invention Steel |
| 14 | 0.35 | 0.180 | 1.30 | 0.044 | 0.014 | 0.0008 | 0.0065 | | | | | | | | | | | Present Invention Steel |
| 15 | 0.35 | 0.290 | 2.00 | 0.037 | 0.013 | 0.0026 | 0.0047 | | | | | | | | | | | Present Invention Steel |
| 16 | 0.35 | 0.280 | 3.20 | 0.027 | 0.010 | 0.0014 | 0.0030 | | | | | | | | | | | Comparative Steel |
| 17 | 0.35 | 0.260 | 1.50 | 0.000 | 0.012 | 0.0030 | 0.0069 | | | | | | | | | | | Comparative Steel |
| 18 | 0.35 | 0.220 | 1.70 | 0.001 | 0.009 | 0.0040 | 0.0047 | | | | | | | | | | | Present Invention Steel |
| 19 | 0.35 | 0.280 | 1.00 | 0.030 | 0.014 | 0.0040 | 0.0070 | | | | | | | | | | | Present Invention Steel |
| 20 | 0.35 | 0.230 | 1.50 | 1.700 | 0.013 | 0.0023 | 0.0060 | | | | | | | | | | | Present Invention Steel |
| 21 | 0.35 | 0.120 | 1.90 | 2.200 | 0.014 | 0.0007 | 0.0038 | | | | | | | | | | | Comparative Steel |
| 22 | 0.35 | 0.190 | 1.70 | 0.045 | 0.001 | 0.0018 | 0.0073 | | | | | | | | | | | Present Invention Steel |

Underlines indicate that the corresponding values are outside the scope of the present invention.

TABLE 1-2

| Steel No. | Chemical composition (mass %), remainder: Fe and impurity ||||||||||||||||| Note |
|---|---|---|---|---|---|---|---|---|---|---|---|---|---|---|---|---|---|---|
| | C | Si | Mn | Al | P | S | N | Nb | Ti | V | Mo | Cr | Cu | Ni | B | Ca | REM | |
| 23 | 0.35 | 0.120 | 1.30 | 0.035 | 0.008 | 0.0020 | 0.0094 | | | | | | | | | | | Present Invention Steel |
| 24 | 0.35 | 0.220 | 2.00 | 0.039 | 0.150 | 0.0035 | 0.0036 | | | | | | | | | | | Comparative Steel |
| 25 | 0.35 | 0.110 | 1.30 | 0.043 | 0.014 | 0.0003 | 0.0070 | | | | | | | | | | | Present Invention Steel |
| 26 | 0.35 | 0.150 | 1.30 | 0.041 | 0.008 | 0.0030 | 0.0065 | | | | | | | | | | | Present Invention Steel |
| 27 | 0.35 | 0.250 | 1.10 | 0.030 | 0.011 | 0.1500 | 0.0057 | | | | | | | | | | | Comparative Steel |
| 28 | 0.35 | 0.270 | 1.50 | 0.035 | 0.013 | 0.0013 | 0.0008 | | | | | | | | | | | Present Invention Steel |

TABLE 1-2-continued

| Steel No. | Chemical composition (mass %), remainder: Fe and impurity | | | | | | | | | | | | | | | | Note |
|---|---|---|---|---|---|---|---|---|---|---|---|---|---|---|---|---|---|
| | C | Si | Mn | Al | P | S | N | Nb | Ti | V | Mo | Cr | Cu | Ni | B | Ca | REM | |
| 29 | 0.35 | 0.280 | 1.40 | 0.030 | 0.009 | 0.0016 | 0.0040 | | | | | | | | | | | Present Invention Steel |
| 30 | 0.35 | 0.240 | 1.70 | 0.035 | 0.012 | 0.0032 | 0.1200 | | | | | | | | | | | Comparative Steel |
| 31 | 0.37 | 0.240 | 1.00 | 0.028 | 0.011 | 0.0038 | 0.0093 | 0.05 | | | | | | | | | | Present Invention Steel |
| 32 | 0.37 | 0.110 | 2.00 | 0.036 | 0.009 | 0.0015 | 0.0072 | | 0.05 | | | | | | | | | Present Invention Steel |
| 33 | 0.37 | 0.190 | 1.30 | 0.038 | 0.015 | 0.0034 | 0.0031 | | | 0.05 | | | | | | | | Present Invention Steel |
| 34 | 0.37 | 0.220 | 1.20 | 0.025 | 0.009 | 0.0017 | 0.0076 | | | | 0.2 | | | | | | | Present Invention Steel |
| 35 | 0.37 | 0.140 | 1.20 | 0.030 | 0.015 | 0.0033 | 0.0083 | | | | | 0.4 | | | | | | Present Invention Steel |
| 36 | 0.37 | 0.110 | 1.40 | 0.041 | 0.009 | 0.0020 | 0.0089 | | | | | | 0.3 | | | | | Present Invention Steel |
| 37 | 0.37 | 0.270 | 1.30 | 0.045 | 0.012 | 0.0020 | 0.0082 | | | | | | | 0.4 | | | | Present Invention Steel |
| 38 | 0.35 | 0.100 | 1.10 | 0.045 | 0.013 | 0.0033 | 0.0038 | | | | | | | | 0.0025 | | | Present Invention Steel |
| 39 | 0.35 | 0.150 | 1.30 | 0.028 | 0.011 | 0.0026 | 0.0061 | | | | | | | | | 0.006 | | Present Invention Steel |
| 40 | 0.35 | 0.170 | 1.40 | 0.028 | 0.012 | 0.0036 | 0.0067 | | | | | | | | | | 0.20 | Present Invention Steel |
| 41 | 0.35 | 2.890 | 1.42 | 0.030 | 0.014 | 0.0022 | 0.0039 | | | | | | | | | | | Present Invention Steel |
| 42 | 0.35 | 0.297 | 2.78 | 0.031 | 0.012 | 0.0024 | 0.0044 | | | | | | | | | | | Present Invention Steel |
| 43 | 0.35 | 0.124 | 1.31 | 0.037 | 0.091 | 0.0025 | 0.0097 | | | | | | | | | | | Present Invention Steel |
| 44 | 0.35 | 0.147 | 1.29 | 0.045 | 0.008 | 0.0870 | 0.0059 | | | | | | | | | | | Present Invention Steel |

Underlines indicate that the corresponding values are outside the scope of the present invention.

TABLE 2-1

| Steel sheet No. | Steel No. | Hot rolling | | | | | | |
|---|---|---|---|---|---|---|---|---|
| | | Rolling temperature one pass before final rolling (° C.) | Rolling reduction one pass before final rolling (%) | Final rolling temperature (° C.) | Rolling reduction of final rolling (%) | Elapsed time from end of hot rolling to start of cooling (sec) | Average cooling rate in temperature range from hot rolling end temperature to 450° C. (° C./s) | Coiling temperature (° C.) |
| 1 | 1 | 856 | 23 | 831 | 10 | 4.2 | 7 | 691 |
| 2 | 2 | 858 | 19 | 807 | 8 | 2.5 | 5 | 675 |
| 3 | 3 | 857 | 21 | 807 | 6 | 3.6 | 8 | 686 |
| 4 | 4 | 873 | 17 | 819 | 12 | 4.0 | 9 | 682 |
| 5 | 5 | 875 | 17 | 825 | 6 | 3.6 | 9 | 634 |
| 6 | 6 | 867 | 17 | 813 | 6 | 4.3 | 9 | 609 |
| 7 | 7 | 872 | 18 | 824 | 10 | 3.3 | 8 | 604 |
| 8 | 8 | 875 | 22 | 835 | 10 | 4.4 | 5 | 614 |
| 9 | 9 | 853 | 23 | 819 | 6 | 3.0 | 6 | 682 |
| 10 | 10 | 860 | 18 | 805 | 11 | 3.3 | 6 | 694 |
| 11 | 11 | 876 | 20 | 832 | 9 | 4.4 | 6 | 614 |
| 12 | 12 | 867 | 22 | 810 | 12 | 4.3 | 6 | 680 |
| 13 | 13 | 855 | 17 | 807 | 8 | 4.5 | 7 | 658 |
| 14 | 14 | 870 | 22 | 820 | 6 | 4.0 | 9 | 647 |
| 15 | 15 | 862 | 21 | 831 | 10 | 3.1 | 8 | 609 |
| 16 | 16 | 854 | 23 | 828 | 6 | 3.6 | 7 | 633 |
| 17 | 17 | 875 | 19 | 808 | 10 | 4.1 | 6 | 623 |
| 18 | 18 | 872 | 23 | 825 | 10 | 4.2 | 6 | 680 |
| 19 | 19 | 858 | 18 | 807 | 8 | 2.9 | 9 | 642 |
| 20 | 20 | 862 | 18 | 810 | 12 | 4.1 | 6 | 651 |
| 21 | 21 | 860 | 20 | 824 | 9 | 3.7 | 5 | 645 |
| 22 | 22 | 852 | 23 | 812 | 10 | 3.2 | 6 | 699 |
| 23 | 23 | 872 | 21 | 818 | 7 | 3.0 | 5 | 646 |
| 24 | 24 | 875 | 19 | 831 | 12 | 3.9 | 5 | 622 |
| 25 | 25 | 864 | 22 | 811 | 9 | 2.8 | 5 | 625 |
| 26 | 26 | 869 | 19 | 820 | 10 | 4.1 | 7 | 695 |

TABLE 2-1-continued

| Steel sheet No. | Steel No. | Rolling temperature one pass before final rolling (° C.) | Rolling reduction one pass before final rolling (%) | Final rolling temperature (° C.) | Rolling reduction of final rolling (%) | Elapsed time from end of hot rolling to start of cooling (sec) | Average cooling rate in temperature range from hot rolling end temperature to 450° C. (° C./s) | Coiling temperature (° C.) |
|---|---|---|---|---|---|---|---|---|
| 27 | 27 | 866 | 22 | 810 | 7 | 3.9 | 9 | 603 |
| 28 | 28 | 857 | 22 | 808 | 12 | 4.5 | 6 | 641 |
| 29 | 29 | 862 | 23 | 824 | 11 | 4.5 | 5 | 699 |
| 30 | 30 | 868 | 23 | 829 | 10 | 3.6 | 6 | 696 |

Underlines indicate that the corresponding values are outside the scope of the present invention and manufacturing conditions are not preferable.

TABLE 2-2

| Steel sheet No. | Steel No. | Rolling temperature one pass before final rolling (° C.) | Rolling reduction one pass before final rolling (%) | Final rolling temperature (° C.) | Rolling reduction of final rolling (%) | Elapsed time from end of hot rolling to start of cooling (sec) | Average cooling rate in temperature range from hot rolling end temperature to 450° C. (° C./s) | Coiling temperature (° C.) |
|---|---|---|---|---|---|---|---|---|
| 31 | 31 | 867 | 19 | 817 | 11 | 4.3 | 6 | 689 |
| 32 | 32 | 866 | 21 | 822 | 9 | 3.0 | 6 | 679 |
| 33 | 33 | 868 | 23 | 819 | 11 | 4.1 | 7 | 629 |
| 34 | 34 | 867 | 19 | 808 | 10 | 3.2 | 5 | 671 |
| 35 | 35 | 876 | 19 | 826 | 7 | 2.5 | 7 | 625 |
| 36 | 36 | 859 | 18 | 816 | 9 | 2.7 | 7 | 638 |
| 37 | 37 | 851 | 19 | 815 | 6 | 3.6 | 6 | 689 |
| 38 | 38 | 868 | 22 | 822 | 8 | 2.6 | 9 | 685 |
| 39 | 39 | 854 | 22 | 822 | 7 | 2.7 | 6 | 618 |
| 40 | 40 | 864 | 19 | 808 | 9 | 3.8 | 8 | 699 |
| 41 | 4 | 800 | 22 | 820 | 9 | 3.7 | 9 | 616 |
| 42 | 4 | 860 | 19 | 820 | 8 | 3.0 | 9 | 689 |
| 43 | 4 | 950 | 21 | 825 | 7 | 3.7 | 9 | 684 |
| 44 | 4 | 873 | 7 | 828 | 8 | 3.9 | 6 | 679 |
| 45 | 4 | 872 | 20 | 825 | 9 | 3.2 | 7 | 671 |
| 46 | 4 | 854 | 35 | 810 | 8 | 3.0 | 6 | 615 |
| 47 | 4 | 850 | 23 | 770 | 9 | 3.0 | 5 | 682 |
| 48 | 4 | 873 | 21 | 820 | 10 | 2.5 | 8 | 632 |
| 49 | 4 | 853 | 23 | 870 | 12 | 4.4 | 5 | 672 |
| 50 | 4 | 853 | 21 | 818 | 4 | 2.8 | 7 | 639 |
| 51 | 4 | 873 | 23 | 823 | 8 | 4.3 | 7 | 603 |
| 52 | 4 | 861 | 22 | 831 | 18 | 2.8 | 5 | 689 |
| 53 | 4 | 862 | 18 | 825 | 6 | 1.5 | 9 | 694 |
| 54 | 4 | 856 | 18 | 827 | 11 | 3.5 | 5 | 692 |
| 55 | 4 | 875 | 21 | 830 | 8 | 6.7 | 6 | 611 |
| 56 | 4 | 875 | 18 | 832 | 10 | 2.8 | 7 | 690 |
| 57 | 4 | 869 | 20 | 813 | 8 | 2.5 | 9 | 665 |
| 58 | 4 | 866 | 22 | 808 | 6 | 3.0 | 15 | 617 |
| 59 | 4 | 872 | 23 | 810 | 7 | 4.4 | 5 | 550 |
| 60 | 4 | 887 | 19 | 808 | 11 | 4.2 | 8 | 650 |

Underlines indicate that the corresponding values are outside the scope of the present invention and manufacturing conditions are not preferable.

TABLE 2-3

| | | Hot rolling | | | | | | |
|---|---|---|---|---|---|---|---|---|
| Steel sheet No. | Steel No. | Rolling temperature one pass before final rolling (° C.) | Rolling reduction one pass before final rolling (%) | Final rolling temperature (° C.) | Rolling reduction of final rolling (%) | Elapsed time from end of hot rolling to start of cooling (sec) | Average cooling rate in temperature range from hot rolling end temperature to 450° C. (° C./s) | Coiling temperature (° C.) |
| 61 | 4 | 866 | 20 | 823 | 7 | 2.5 | 9 | 750 |
| 62 | 4 | 856 | 21 | 834 | 10 | 2.5 | 5 | 630 |
| 63 | 4 | 860 | 20 | 834 | 8 | 4.5 | 9 | 681 |
| 64 | 4 | 855 | 20 | 817 | 9 | 4.1 | 7 | 603 |
| 65 | 4 | 850 | 17 | 812 | 11 | 2.9 | 7 | 685 |
| 66 | 4 | 856 | 23 | 832 | 11 | 4.5 | 6 | 699 |
| 67 | 4 | 870 | 23 | 832 | 8 | 4.4 | 6 | 685 |
| 68 | 4 | 855 | 21 | 821 | 12 | 4.4 | 6 | 676 |
| 69 | 4 | 867 | 23 | 814 | 9 | 3.6 | 6 | 638 |
| 70 | 4 | 867 | 22 | 831 | 7 | 4.4 | 8 | 657 |
| 71 | 4 | 875 | 18 | 832 | 8 | 4.1 | 9 | 663 |
| 72 | 4 | 864 | 17 | 805 | 11 | 3.0 | 7 | 653 |
| 73 | 4 | 866 | 21 | 809 | 12 | 3.0 | 9 | 628 |
| 74 | 4 | 871 | 22 | 812 | 7 | 3.6 | 5 | 636 |
| 75 | 4 | 857 | 22 | 807 | 8 | 4.0 | 9 | 602 |
| 76 | 4 | 873 | 18 | 822 | 8 | 3.8 | 5 | 691 |
| 77 | 4 | 873 | 22 | 830 | 9 | 3.1 | 8 | 674 |
| 78 | 4 | 866 | 21 | 822 | 11 | 3.3 | 6 | 660 |
| 79 | 4 | 865 | 19 | 826 | 6 | 4.2 | 8 | 693 |
| 80 | 4 | 865 | 17 | 811 | 12 | 3.0 | 8 | 631 |
| 81 | 4 | 858 | 21 | 811 | 7 | 3.2 | 9 | 642 |
| 82 | 4 | 854 | 22 | 820 | 11 | 3.8 | 7 | 668 |
| 83 | 4 | 868 | 20 | 827 | 8 | 4.2 | 9 | 686 |
| 84 | 4 | 875 | 19 | 833 | 9 | 3.2 | 7 | 669 |
| 85 | 4 | 860 | 22 | 821 | 6 | 3.0 | 7 | 686 |
| 86 | 4 | 859 | 19 | 821 | 9 | 4.4 | 6 | 616 |
| 87 | 41 | 856 | 18 | 811 | 10 | 2.9 | 6 | 698 |
| 88 | 42 | 855 | 23 | 821 | 11 | 2.7 | 8 | 609 |
| 89 | 43 | 875 | 22 | 814 | 8 | 3.4 | 4 | 651 |
| 90 | 44 | 879 | 20 | 828 | 9 | 4.2 | 7 | 697 |

Underlines indicate that the corresponding values are outside the scope of the present invention and manufacturing conditions are not preferable.

TABLE 2-4

| | | Cold rolling | | Decarburization annealing | | Plating | | |
|---|---|---|---|---|---|---|---|---|
| Steel sheet No. | Steel No. | Presence or absence of softening heat treatment | Cumulative rolling reduction (%) | Maximum attainment temperature (° C.) | Residence time in temperature range of 700° C. to 950° C. (sec) | Presence or absence of plating | Plating annealing after decarburization annealing | Note |
| 1 | 1 | Absent | 69 | 830 | 151 | | | Comparative Example |
| 2 | 2 | Absent | 66 | 818 | 166 | | | Present Invention Example |
| 3 | 3 | Absent | 36 | 784 | 172 | | | Present Invention Example |
| 4 | 4 | Absent | 30 | 773 | 135 | | | Present Invention Example |
| 5 | 5 | Absent | 41 | 808 | 216 | | | Present Invention Example |
| 6 | 6 | Absent | 39 | 811 | 268 | | | Comparative Example |
| 7 | 7 | Absent | 45 | 789 | 231 | | | Comparative Example |
| 8 | 8 | Absent | 45 | 818 | 273 | | | Present Invention Example |
| 9 | 9 | Absent | 33 | 801 | 237 | | | Present Invention Example |
| 10 | 10 | Absent | 64 | 818 | 228 | | | Present Invention Example |
| 11 | 11 | Absent | 44 | 801 | 277 | | | Comparative Example |
| 12 | 12 | Absent | 66 | 775 | 209 | | | Comparative Example |
| 13 | 13 | Absent | 65 | 795 | 219 | | | Present Invention Example |
| 14 | 14 | Absent | 63 | 776 | 197 | | | Present Invention Example |
| 15 | 15 | Absent | 40 | 803 | 183 | | | Present Invention Example |
| 16 | 16 | Absent | 54 | 805 | 250 | | | Comparative Example |
| 17 | 17 | Absent | 64 | 810 | 177 | | | Comparative Example |
| 18 | 18 | Absent | 66 | 828 | 216 | | | Present Invention Example |
| 19 | 19 | Absent | 33 | 826 | 248 | | | Present Invention Example |
| 20 | 20 | Absent | 54 | 824 | 280 | | | Present Invention Example |

TABLE 2-4-continued

| Steel sheet No. | Steel No. | Cold rolling Presence or absence of softening heat treatment | Cumulative rolling reduction (%) | Decarburization annealing Maximum attainment temperature (° C.) | Residence time in temperature range of 700° C. to 950° C. (sec) | Plating Presence or absence of plating | Plating annealing after decarburization annealing | Note |
|---|---|---|---|---|---|---|---|---|
| 21 | 21 | Absent | 32 | 822 | 179 | | | Comparative Example |
| 22 | 22 | Absent | 31 | 827 | 167 | | | Present Invention Example |
| 23 | 23 | Absent | 40 | 786 | 197 | | | Present Invention Example |
| 24 | 24 | Absent | 32 | 823 | 167 | | | Comparative Example |
| 25 | 25 | Absent | 49 | 787 | 258 | | | Present Invention Example |
| 26 | 26 | Absent | 70 | 800 | 150 | | | Present Invention Example |
| 27 | 27 | Absent | 52 | 787 | 187 | | | Comparative Example |
| 28 | 28 | Absent | 43 | 817 | 140 | | | Present Invention Example |
| 29 | 29 | Absent | 49 | 808 | 148 | | | Present Invention Example |
| 30 | 30 | Absent | 46 | 813 | 265 | | | Comparative Example |

Underlines indicate that the corresponding values are outside the scope of the present invention and manufacturing conditions are not preferable.

TABLE 2-5

| Steel sheet No. | Steel No. | Cold rolling Presence or absence of softening heat treatment | Cumulative rolling reduction (%) | Decarburization annealing Maximum attainment temperature (° C.) | Residence time in temperature range of 700° C. to 950° C. (sec) | Plating Presence or absence of plating | Plating annealing after decarburization annealing | Note |
|---|---|---|---|---|---|---|---|---|
| 31 | 31 | Absent | 51 | 808 | 209 | | | Present Invention Example |
| 32 | 32 | Absent | 55 | 778 | 270 | | | Present Invention Example |
| 33 | 33 | Absent | 46 | 792 | 167 | | | Present Invention Example |
| 34 | 34 | Absent | 57 | 819 | 246 | | | Present Invention Example |
| 35 | 35 | Absent | 54 | 815 | 267 | | | Present Invention Example |
| 36 | 36 | Absent | 69 | 774 | 275 | | | Present Invention Example |
| 37 | 37 | Absent | 43 | 804 | 240 | | | Present Invention Example |
| 38 | 38 | Absent | 65 | 822 | 238 | | | Present Invention Example |
| 39 | 39 | Absent | 56 | 784 | 209 | | | Present Invention Example |
| 40 | 40 | Absent | 58 | 824 | 130 | | | Present Invention Example |
| 41 | 4 | Absent | 41 | 775 | 251 | | | Comparative Example |
| 42 | 4 | Absent | 39 | 828 | 151 | | | Present Invention Example |
| 43 | 4 | Absent | 61 | 814 | 241 | | | Comparative Example |
| 44 | 4 | Absent | 37 | 828 | 173 | | | Comparative Example |
| 45 | 4 | Absent | 62 | 789 | 166 | | | Present Invention Example |
| 46 | 4 | Absent | 48 | 775 | 211 | | | Comparative Example |
| 47 | 4 | Absent | 40 | 806 | 265 | | | Comparative Example |
| 48 | 4 | Absent | 70 | 817 | 165 | | | Present Invention Example |
| 49 | 4 | Absent | 45 | 798 | 130 | | | Comparative Example |
| 50 | 4 | Absent | 44 | 811 | 232 | | | Comparative Example |
| 51 | 4 | Absent | 37 | 775 | 225 | | | Present Invention Example |
| 52 | 4 | Absent | 42 | 812 | 262 | | | Comparative Example |
| 53 | 4 | Absent | 33 | 817 | 255 | | | Comparative Example |
| 54 | 4 | Absent | 48 | 814 | 275 | | | Present Invention Example |
| 55 | 4 | Absent | 61 | 792 | 137 | | | Present Invention Example |
| 56 | 4 | Absent | 58 | 800 | 273 | | | Present Invention Example |
| 57 | 4 | Absent | 62 | 792 | 197 | | | Present Invention Example |
| 58 | 4 | Absent | 52 | 814 | 149 | | | Comparative Example |
| 59 | 4 | Absent | 37 | 812 | 215 | | | Present Invention Example |
| 60 | 4 | Absent | 67 | 779 | 276 | | | Present Invention Example |

Underlines indicate that the corresponding values are outside the scope of the present invention and manufacturing conditions are not preferable.

TABLE 2-6

| Steel sheet No. | Steel No. | Cold rolling Presence or absence of softening heat treatment | Cold rolling Cumulative rolling reduction (%) | Decarburization annealing Maximum attainment temperature (° C.) | Decarburization annealing Residence time in temperature range of 700° C. to 950° C. (sec) | Plating Presence or absence of plating | Plating Plating annealing after decarburization annealing | Note |
|---|---|---|---|---|---|---|---|---|
| 61 | 4 | Absent | 44 | 785 | 234 | | | Comparative Example |
| 62 | 4 | Present | 59 | 809 | 267 | | | Present Invention Example |
| 63 | 4 | Absent | 40 | 814 | 272 | | | Present Invention Example |
| 64 | 4 | Absent | 55 | <u>660</u> | 155 | | | Comparative Example |
| 65 | 4 | Absent | 31 | <u>720</u> | 269 | | | Present Invention Example |
| 66 | 4 | Absent | 64 | 800 | 263 | | | Present Invention Example |
| 67 | 4 | Absent | 61 | 900 | 247 | | | Present Invention Example |
| 68 | 4 | Absent | 50 | <u>970</u> | 263 | | | Comparative Example |
| 69 | 4 | Absent | 56 | <u>806</u> | <u>3</u> | | | Comparative Example |
| 70 | 4 | Absent | 62 | 770 | <u>60</u> | | | Present Invention Example |
| 71 | 4 | Absent | 54 | 770 | 180 | | | Present Invention Example |
| 72 | 4 | Absent | 45 | 812 | 900 | | | Present Invention Example |
| 73 | 4 | Absent | 54 | 793 | <u>1300</u> | | | Comparative Example |
| 74 | 4 | Absent | 44 | 803 | <u>234</u> | Present | | Present Invention Example |
| 75 | 4 | Absent | 56 | 773 | 189 | | Present | Present Invention Example |
| 76 | 4 | Absent | 67 | 777 | 268 | | | Present Invention Example |
| 77 | 4 | Absent | 58 | 798 | 138 | | | Present Invention Example |
| 78 | 4 | Absent | 35 | 829 | 246 | | | Present Invention Example |
| 79 | 4 | Absent | 52 | 799 | 211 | | | Present Invention Example |
| 80 | 4 | Absent | 33 | 801 | 151 | | | Present invention Example |
| 81 | 4 | Absent | 37 | 805 | 203 | | | Present Invention Example |
| 82 | 4 | Absent | 49 | 823 | 179 | | | Present Invention Example |
| 83 | 4 | Absent | 31 | 821 | 276 | | | Present Invention Example |
| 84 | 4 | Absent | 64 | 802 | 163 | | | Present Invention Example |
| 85 | 4 | Absent | 46 | 801 | 176 | | | Present Invention Example |
| 86 | 4 | Absent | 67 | 801 | 146 | | | Present Invention Example |
| 87 | 41 | Absent | 66 | 828 | 216 | | | Present Invention Example |
| 88 | 42 | Absent | 42 | 794 | 189 | | | Present Invention Example |
| 89 | 43 | Absent | 38 | 782 | 188 | | | Present Invention Example |
| 90 | 44 | Absent | 64 | 802 | 135 | | | Present Invention Example |

Underlines indicate that the corresponding values are outside the scope of the present invention and manufacturing conditions are not preferable.

TABLE 3-1

| Steel sheet No. | Steel No. | Steel sheet for hot stamping Ferrite, granular bainite, bainite, and martensite (area %) | Pearlite and carbide (area %) | Ratio between pole density of orientation group consisting of {001} <1-10> to {001} <-1-10> and pole density of orientation group consisting of {111} <1-10> to {111} <-1-12> in texture of surface layer region | Ratio between pole density of orientation group consisting of {001} <1-10> to {001} <-1-10> and pole density of orientation group consisting of {111} <1-10> to {111} <-1-12> in texture of inside region | Decarburization index | Sheet thickness (mm) | Note |
|---|---|---|---|---|---|---|---|---|
| 1 | 1 | 28 | 72 | 1.3 | 1.9 | 0.174 | 1.6 | Comparative Example |
| <u>2</u> | <u>2</u> | 52 | 48 | 1.2 | 1.6 | 0.198 | 1.6 | Present Invention Example |
| 3 | 3 | 74 | 26 | 1.3 | 1.8 | 0.244 | 1.6 | Present Invention Example |
| 4 | 4 | 22 | 78 | 1.3 | 1.7 | 0.270 | 1.6 | Present Invention Example |
| 5 | 5 | 37 | 63 | 1.2 | 1.7 | 0.320 | 1.6 | Present Invention Example |
| 6 | 6 | 68 | 32 | 1.3 | 1.9 | 0.376 | 1.6 | Comparative Example |
| <u>7</u> | <u>7</u> | 22 | 78 | 1.3 | 1.7 | 0.283 | 1.6 | Comparative Example |
| <u>8</u> | <u>8</u> | 43 | 57 | 1.3 | 1.6 | 0.267 | 1.6 | Present Invention Example |
| 9 | 9 | 41 | 59 | 1.2 | 1.7 | 0.250 | 1.6 | Present Invention Example |
| 10 | 10 | 56 | 44 | 1.2 | 1.8 | 0.236 | 1.6 | Present Invention Example |
| <u>11</u> | <u>11</u> | 60 | 40 | 1.2 | 1.9 | 0.243 | 1.6 | Comparative Example |
| <u>12</u> | <u>12</u> | 43 | 57 | 1.3 | 1.8 | 0.241 | 1.6 | Comparative Example |
| <u>13</u> | <u>13</u> | 60 | 40 | 1.3 | 1.6 | 0.266 | 1.6 | Present Invention Example |
| 14 | 14 | 77 | 23 | 1.2 | 1.8 | 0.285 | 1.6 | Present Invention Example |
| 15 | 15 | 30 | 70 | 1.2 | 1.8 | 0.279 | 1.6 | Present Invention Example |
| 16 | 16 | 50 | 50 | 1.2 | 1.6 | 0.279 | 1.6 | Comparative Example |
| <u>17</u> | <u>17</u> | 21 | 79 | 1.3 | 1.7 | 0.261 | 1.6 | Comparative Example |

TABLE 3-1-continued

| | | Steel sheet for hot stamping | | | | | | |
|---|---|---|---|---|---|---|---|---|
| Steel sheet No. | Steel No. | Ferrite, granular bainite, bainite, and martensite (area %) | Pearlite and carbide (area %) | Ratio between pole density of orientation group consisting of {001} <1-10> to {001} <-1-10> and pole density of orientation group consisting of {111} <1-10> to {111} <-1-12> in texture of surface layer region | Ratio between pole density of orientation group consisting of {001} <1-10> to {001} <-1-10> and pole density of orientation group consisting of {111} <1-10> to {111} <-1-12> in texture of inside region | Decarburization index | Sheet thickness (mm) | Note |
| 18 | 18 | 31 | 69 | 1.3 | 1.9 | 0.280 | 1.6 | Present Invention Example |
| 19 | 19 | 51 | 49 | 1.3 | 1.8 | 0.279 | 1.6 | Present Invention Example |
| 20 | 20 | 34 | 66 | 1.2 | 1.9 | 0.277 | 1.6 | Present Invention Example |
| 21 | 21 | 60 | 40 | 1.2 | 1.6 | 0.248 | 1.6 | Comparative Example |
| 22 | 22 | 28 | 72 | 1.3 | 1.6 | 0.268 | 1.6 | Present Invention Example |
| 23 | 23 | 66 | 34 | 1.2 | 1.7 | 0.280 | 1.6 | Present Invention Example |
| 24 | 24 | 25 | 75 | 1.2 | 1.7 | 0.257 | 1.6 | Comparative Example |
| 25 | 25 | 54 | 46 | 1.2 | 1.7 | 0.260 | 1.6 | Present Invention Ex ample |
| 26 | 26 | 75 | 25 | 1.2 | 1.6 | 0.261 | 1.6 | Present Invention Example |
| 27 | 27 | 52 | 48 | 1.2 | 1.8 | 0.273 | 1.6 | Comparative Example |
| 28 | 28 | 39 | 61 | 1.3 | 1.8 | 0.261 | 1.6 | Present Invention Example |
| 29 | 29 | 55 | 45 | 1.3 | 1.7 | 0.260 | 1.6 | Present Invention Example |
| 30 | 30 | 71 | 29 | 1.2 | 1.7 | 0.236 | 1.6 | Comparative Example |

Underlines indicate that the corresponding values are outside the scope of the present invention and manufacturing conditions are not preferable.

TABLE 3-2

| | | Steel sheet for hot stamping | | | | | | |
|---|---|---|---|---|---|---|---|---|
| Steel sheet No. | Steel No. | Ferrite, granular bainite, bainite, and martensite (area %) | Pearlite and carbide (area %) | Ratio between pole density of orientation group consisting of {001} <1-10> to {001} <-1-10> and pole density of orientation group consisting of {111} <1-10> to {111} <-1-12> in texture of surface layer region | Ratio between pole density of orientation group consisting of {001} <1-10> to {001} <-1-10> and pole density of orientation group consisting of {111} <1-10> to {111} <-1-12> in texture of inside region | Decarburization index | Sheet thickness (mm) | Note |
| 31 | 31 | 70 | 30 | 1.2 | 1.6 | 0.271 | 1.6 | Present Invention Example |
| 32 | 32 | 24 | 76 | 1.3 | 1.6 | 0.280 | 1.6 | Present Invention Example |
| 33 | 33 | 23 | 77 | 1.2 | 1.6 | 0.259 | 1.6 | Present Invention Example |
| 34 | 34 | 76 | 24 | 1.2 | 1.8 | 0.249 | 1.6 | Present Invention Example |
| 35 | 35 | 28 | 72 | 1.3 | 1.7 | 0.251 | 1.6 | Present Invention Example |
| 36 | 36 | 76 | 24 | 1.3 | 1.9 | 0.284 | 1.6 | Present Invention Example |
| 37 | 37 | 55 | 45 | 1.3 | 1.8 | 0.241 | 1.6 | Present Invention Example |
| 38 | 38 | 28 | 72 | 1.2 | 1.7 | 0.231 | 1.6 | Present Invention Example |
| 39 | 39 | 57 | 43 | 1.2 | 1.7 | 0.261 | 1.6 | Present Invention Example |
| 40 | 40 | 38 | 62 | 1.2 | 1.6 | 0.236 | 1.6 | Present Invention Example |
| 41 | 4 | 40 | 60 | 1.8 | 2.4 | 0.254 | 1.6 | Comparative Example |
| 42 | 4 | 58 | 42 | 1.2 | 1.5 | 0.275 | 1.6 | Present Invention Example |
| 43 | 4 | 37 | 63 | 1.8 | 2.2 | 0.277 | 1.6 | Comparative Example |
| 44 | 4 | 26 | 74 | 1.9 | 2.6 | 0.248 | 1.6 | Comparative Example |
| 45 | 4 | 49 | 51 | 0.8 | 1.1 | 0.239 | 1.6 | Present Invention Example |
| 46 | 4 | 40 | 60 | 1.9 | 2.4 | 0.239 | 1.6 | Comparative Example |
| 47 | 4 | 51 | 49 | 1.9 | 2.6 | 0.243 | 1.6 | Comparative Example |
| 48 | 4 | 72 | 28 | 1.1 | 1.1 | 0.268 | 1.6 | Present Invention Example |
| 49 | 4 | 57 | 43 | 1.9 | 2.3 | 0.243 | 1.6 | Comparative Example |
| 50 | 4 | 23 | 77 | 1.7 | 2.4 | 0.239 | 1.6 | Comparative Example |
| 51 | 4 | 69 | 31 | 1.1 | 1.5 | 0.263 | 1.6 | Present Invention Example |
| 52 | 4 | 21 | 79 | 1.9 | 2.3 | 0.251 | 1.6 | Comparative Example |
| 53 | 4 | 68 | 32 | 1.7 | 1.4 | 0.232 | 1.6 | Comparative Example |
| 54 | 4 | 43 | 57 | 1.3 | 1.7 | 0.274 | 1.6 | Present Invention Example |
| 55 | 4 | 27 | 73 | 1.2 | 1.4 | 0.260 | 1.6 | Present Invention Example |
| 56 | 4 | 69 | 31 | 0.9 | 1.2 | 0.246 | 1.6 | Present Invention Example |

TABLE 3-2-continued

| | | | | Steel sheet for hot stamping | | | | |
|---|---|---|---|---|---|---|---|---|
| Steel sheet No. | Steel No. | Ferrite, granular bainite, bainite, and martensite (area %) | Pearlite and carbide (area %) | Ratio between pole density of orientation group consisting of {001} <1-10> to {001} <-1-10> and pole density of orientation group consisting of {111} <1-10> to {111} <-1-12> in texture of surface layer region | Ratio between pole density of orientation group consisting of {001} <1-10> to {001} <-1-10> and pole density of orientation group consisting of {111} <1-10> to {111} <-1-12> in texture of inside region | Decarburization index | Sheet thickness (mm) | Note |
| 57 | 4 | 31 | 69 | 1.3 | 1.8 | 0.230 | 1.6 | Present Invention Example |
| <u>58</u> | 4 | 33 | 67 | <u>1.8</u> | <u>2.6</u> | 0.243 | 1.6 | Comparative Example |
| <u>59</u> | 4 | 42 | 58 | <u>1.2</u> | <u>1.5</u> | 0.239 | 1.6 | Present Invention Example |
| 60 | 4 | 45 | 55 | 1.2 | 1.8 | 0.234 | 1.6 | Present Invention Example |

Underlines indicate that the corresponding values are outside the scope of the present invention and manufacturing conditions are not preferable.

TABLE 3-3

| | | | | Steel sheet for hot stamping | | | | |
|---|---|---|---|---|---|---|---|---|
| Steel sheet No. | Steel No. | Ferrite, granular bainite, bainite, and martensite (area %) | Pearlite and carbide (area %) | Ratio between pole density of orientation group consisting of {001} <1-10> to {001} <-1-10> and pole density of orientation group consisting of {111} <1-10> to {111} <-1-12> in texture of surface layer region | Ratio between pole density of orientation group consisting of {001} <1-10> to {001} <-1-10> and pole density of orientation group consisting of {111} <1-10> to {111} <-1-12> in texture of inside region | Decarburization index | Sheet thickness (mm) | Note |
| <u>61</u> | 4 | 69 | 31 | <u>1.9</u> | <u>2.2</u> | 0.271 | 1.6 | Comparative Example |
| 62 | 4 | 26 | 74 | 1.2 | 1.6 | 0.260 | 1.6 | Present Invention Example |
| 63 | 4 | 71 | 29 | 1.2 | 1.7 | 0.270 | 1.6 | Present Invention Example |
| <u>64</u> | 4 | 55 | 45 | <u>1.7</u> | 1.9 | 0.078 | 1.6 | Comparative Example |
| <u>65</u> | 4 | 25 | 75 | 1.2 | 1.7 | 0.159 | 1.6 | Present Invention Example |
| 66 | 4 | 57 | 43 | 0.9 | 1.2 | 0.221 | 1.6 | Present Invention Example |
| 67 | 4 | 80 | 20 | 1.2 | 1.7 | 0.342 | 1.6 | Present Invention Example |
| <u>68</u> | 4 | 35 | 65 | <u>1.9</u> | 1.6 | 0.520 | 1.6 | Comparative Example |
| <u>69</u> | 4 | 64 | 36 | <u>1.8</u> | 1.7 | 0.016 | 1.6 | Comparative Example |
| 70 | 4 | 72 | 28 | 1.3 | 1.8 | 0.097 | 1.6 | Present Invention Example |
| 71 | 4 | 36 | 64 | 0.9 | 1.3 | 0.261 | 1.6 | Present Invention Example |
| 72 | 4 | 75 | 25 | 1.3 | 1.7 | 0.423 | 1.6 | Present Invention Example |
| <u>73</u> | 4 | 72 | 28 | <u>1.6</u> | 1.8 | 0.514 | 1.6 | Comparative Example |
| 74 | 4 | 28 | 72 | 1.2 | 1.8 | 0.244 | 1.6 | Present Invention Example |
| 75 | 4 | 77 | 23 | 1.3 | 1.8 | 0.289 | 1.6 | Present Invention Example |
| 76 | 4 | 70 | 30 | 1.2 | 1.6 | 0.273 | 1.6 | Present Invention Example |
| 77 | 4 | 24 | 76 | 1.2 | 1.9 | 0.265 | 1.6 | Present Invention Example |
| 78 | 4 | 74 | 26 | 1.2 | 1.6 | 0.264 | 1.6 | Present Invention Example |
| 79 | 4 | 21 | 79 | 1.3 | 1.8 | 0.275 | 1.6 | Present Invention Example |
| 80 | 4 | 43 | 57 | 1.2 | 1.6 | 0.281 | 1.6 | Present Invention Example |
| 81 | 4 | 21 | 79 | 1.2 | 1.8 | 0.271 | 1.6 | Present Invention Example |
| 82 | 4 | 47 | 53 | 1.3 | 1.8 | 0.247 | 1.6 | Present Invention Example |
| 83 | 4 | 50 | 50 | 1.2 | 1.8 | 0.246 | 1.6 | Present Invention Example |
| 84 | 4 | 59 | 41 | 1.3 | 1.9 | 0.282 | 1.6 | Present Invention Example |
| 85 | 4 | 39 | 61 | 1.3 | 1.6 | 0.246 | 1.6 | Present Invention Example |
| 86 | 4 | 76 | 24 | 1.2 | 1.8 | 0.235 | 1.6 | Present Invention Example |
| 87 | 41 | 55 | 40 | 1.2 | 1.7 | 0.275 | 1.6 | Present Invention Example |
| 88 | 42 | 29 | 66 | 1.1 | 1.7 | 0.291 | 1.6 | Present Invention Example |
| 89 | 43 | 64 | 36 | 1.1 | 1.6 | 0.254 | 1.6 | Present Invention Example |
| 90 | 44 | 75 | 28 | 1.1 | 1.5 | 0.270 | 1.6 | Present Invention Example |

Underlines indicate that the corresponding values are outside the scope of the present invention and manufacturing conditions are not preferable.

TABLE 4-A-1

| Manufacturing No. | Steel Sheet No. | Steel No. | Heating temperature (° C.) | Holding time (s) | Forming temperature (° C.) | Cooling rate to temperature range of 300° C. or lower (° C./s) | Tempering treatment | Partially softened region | Note |
|---|---|---|---|---|---|---|---|---|---|
| 1 | *1* | *1* | 880 | 306 | 873 | 21 | | | Comparative Example |
| 2 | *2* | *2* | 890 | 325 | 866 | 31 | | | Present Invention Example |
| 3 | 3 | 3 | 960 | 231 | 864 | 42 | | | Present Invention Example |
| 4 | 4 | 4 | 930 | 330 | 868 | 48 | Present | | Present Invention Example |
| 5 | 5 | 5 | 880 | 295 | 875 | 25 | | | Present Invention Example |
| 6 | *6* | *6* | 970 | 322 | 876 | 35 | | | Comparative Example |
| 7 | *7* | *7* | 870 | 315 | 813 | 38 | | | Comparative Example |
| 8 | *8* | *8* | 870 | 324 | 868 | 27 | | | Present Invention Example |
| 9 | 9 | 9 | 920 | 237 | 828 | 37 | | | Present Invention Example |
| 10 | 10 | 10 | 870 | 192 | 849 | 28 | | | Present Invention Example |
| 11 | *11* | *11* | 940 | 293 | 808 | 44 | | | Comparative Example |
| 12 | *12* | *12* | 940 | 190 | 862 | 40 | | | Comparative Example |
| 13 | *13* | *13* | 970 | 251 | 811 | 34 | | Present | Present Invention Example |
| 14 | 14 | 14 | 900 | 225 | 796 | 37 | | | Present Invention Example |
| 15 | 15 | 15 | 910 | 294 | 816 | 25 | | | Present Invention Example |
| 16 | *16* | *16* | 870 | 316 | 805 | 37 | | | Comparative Example |
| 17 | *17* | *17* | 960 | 322 | 868 | 42 | | | Comparative Example |
| 18 | *18* | *18* | 940 | 293 | 874 | 43 | | | Present Invention Example |
| 19 | 19 | 19 | 930 | 192 | 871 | 35 | Present | | Present Invention Example |
| 20 | 20 | 20 | 940 | 282 | 797 | 42 | | | Present Invention Example |
| 21 | 21 | 21 | 960 | 270 | 877 | 49 | | | Comparative Example |
| 22 | *22* | *22* | 900 | 291 | 883 | 48 | | | Present Invention Example |
| 23 | 23 | 23 | 900 | 232 | 889 | 36 | | | Present Invention Example |
| 24 | *24* | *24* | 960 | 292 | 865 | 24 | | | Comparative Example |
| 25 | *25* | *25* | 960 | 238 | 825 | 18 | | | Present Invention Example |
| 26 | 26 | 26 | 920 | 214 | 852 | 17 | | | Present Invention Example |
| 27 | 27 | 27 | 890 | 206 | 833 | 19 | | | Comparative Example |
| 28 | *28* | *28* | 920 | 243 | 824 | 21 | | | Present Invention Example |
| 29 | 29 | 29 | 900 | 193 | 791 | 32 | | | Present Invention Example |
| 30 | *30* | *30* | 920 | 263 | 850 | 47 | | | Comparative Example |

Underlines indicate that the corresponding values are outside the scope of the present invention and manufacturing conditions are not preferable.

TABLE 4-A-2

| Manufacturing No. | Steel Sheet No. | Steel No. | Heating temperature (° C.) | Holding time (s) | Forming temperature (° C.) | Cooling rate to temperature range of 300° C. or lower (° C./s) | Tempering treatment | Partially softened region | Note |
|---|---|---|---|---|---|---|---|---|---|
| 31 | 31 | 31 | 910 | 311 | 853 | 22 | | | Present Invention Example |
| 32 | 32 | 32 | 940 | 307 | 856 | 35 | | | Present Invention Example |
| 33 | 33 | 33 | 890 | 301 | 852 | 26 | | | Present Invention Example |
| 34 | 34 | 34 | 950 | 338 | 876 | 45 | | | Present Invention Example |
| 35 | 35 | 35 | 970 | 233 | 882 | 16 | | | Present Invention Example |
| 36 | 36 | 36 | 890 | 313 | 885 | 49 | | | Present Invention Example |
| 37 | 37 | 37 | 930 | 251 | 830 | 30 | | | Present Invention Example |
| 38 | 38 | 38 | 920 | 301 | 877 | 32 | | | Present Invention Example |
| 39 | 39 | 39 | 890 | 329 | 843 | 36 | | | Present Invention Example |
| 40 | 40 | 40 | 880 | 324 | 877 | 38 | | | Present Invention Example |
| 41 | *41* | 4 | 910 | 291 | 820 | 34 | | | Comparative Example |
| 42 | *42* | 4 | 970 | 330 | 812 | 29 | | | Present Invention Example |
| 43 | *43* | 4 | 950 | 280 | 853 | 17 | | | Comparative Example |
| 44 | *44* | 4 | 920 | 323 | 802 | 46 | | | Comparative Example |
| 45 | *45* | 4 | 900 | 221 | 847 | 49 | | | Present Invention Example |
| 46 | 46 | 4 | 890 | 339 | 865 | 23 | | | Comparative Example |
| 47 | *47* | 4 | 920 | 228 | 853 | 20 | | | Comparative Example |
| 48 | *48* | 4 | 870 | 227 | 816 | 35 | | | Present Invention Example |
| 49 | *49* | 4 | 940 | 258 | 872 | 27 | | | Comparative Example |
| 50 | *50* | 4 | 960 | 204 | 834 | 34 | | | Comparative Example |
| 51 | *51* | 4 | 920 | 253 | 890 | 20 | | | Present Invention Example |
| 52 | *52* | 4 | 870 | 262 | 877 | 30 | | | Comparative Example |

TABLE 4-A-2-continued

| | | | Hot stamping conditions | | | | | | |
|---|---|---|---|---|---|---|---|---|---|
| Manufacturing No. | Steel Sheet No. | Steel No. | Heating temperature (° C.) | Holding time (s) | Forming temperature (° C.) | Cooling rate to temperature range of 300° C. or lower (° C./s) | Tempering treatment | Partially softened region | Note |
| 53 | 53 | 4 | 870 | 299 | 794 | 28 | | | Comparative Example |
| 54 | 54 | 4 | 920 | 192 | 812 | 15 | | | Present Invention Example |
| 55 | 55 | 4 | 930 | 339 | 829 | 19 | | | Present Invention Example |
| 56 | 56 | 4 | 960 | 302 | 887 | 50 | | Present | Present Invention Example |
| 57 | 57 | 4 | 920 | 273 | 811 | 48 | | | Present Invention Example |
| 58 | 58 | 4 | 900 | 259 | 821 | 21 | | | Comparative Example |
| 59 | 59 | 4 | 920 | 227 | 790 | 20 | | | Present Invention Example |
| 60 | 60 | 4 | 920 | 309 | 850 | 30 | | | Present Invention Example |

Underlines indicate that the corresponding values are outside the scope of the present invention and manufacturing conditions are not preferable.

TABLE 4-A-3

| | | | Hot stamping conditions | | | | | | |
|---|---|---|---|---|---|---|---|---|---|
| Manufacturing No. | Steel Sheet No. | Steel No. | Heating temperature (° C.) | Holding time (s) | Forming temperature (° C.) | Cooling rate to temperature range of 300° C. or lower (° C./s) | Tempering treatment | Partially softened region | Note |
| 61 | 61 | 4 | 960 | 312 | 858 | 28 | | | Comparative Example |
| 62 | 62 | 4 | 880 | 249 | 811 | 26 | | | Present Invention Example |
| 63 | 63 | 4 | 940 | 237 | 802 | 41 | | | Present Invention Example |
| 64 | 64 | 4 | 960 | 197 | 798 | 34 | | | Comparative Example |
| 65 | 65 | 4 | 960 | 304 | 812 | 23 | | | Present Invention Example |
| 66 | 66 | 4 | 910 | 322 | 836 | 19 | | | Present Invention Example |
| 67 | 67 | 4 | 890 | 336 | 799 | 20 | | | Present Invention Example |
| 68 | 68 | 4 | 920 | 308 | 800 | 39 | | | Comparative Example |
| 69 | 69 | 4 | 940 | 227 | 840 | 21 | | | Comparative Example |
| 70 | 70 | 4 | 960 | 240 | 866 | 15 | | | Present Invention Example |
| 71 | 71 | 4 | 960 | 280 | 829 | 35 | | Present | Present Invention Example |
| 72 | 72 | 4 | 910 | 225 | 820 | 27 | | | Present Invention Example |
| 73 | 73 | 4 | 970 | 207 | 889 | 47 | | | Comparative Example |
| 74 | 74 | 4 | 900 | 331 | 843 | 43 | | | Present Invention Example |
| 75 | 75 | 4 | 920 | 261 | 868 | 34 | | | Present Invention Example |
| 76 | 76 | 4 | 770 | 303 | 829 | 40 | | | Comparative Example |
| 77 | 77 | 4 | 920 | 238 | 807 | 21 | | | Present Invention Example |
| 78 | 78 | 4 | 1030 | 339 | 843 | 48 | | | Comparative Example |
| 79 | 79 | 4 | 910 | 45 | 884 | 49 | | | Comparative Example |
| 80 | 80 | 4 | 920 | 240 | 888 | 23 | | | Present Invention Example |
| 81 | 81 | 4 | 880 | 630 | 836 | 36 | | | Comparative Example |
| 82 | 82 | 4 | 960 | 290 | 600 | 32 | | | Comparative Example |
| 83 | 83 | 4 | 870 | 316 | 840 | 16 | | | Present Invention Example |
| 84 | 84 | 4 | 970 | 316 | 1030 | 47 | | | Comparative Example |
| 85 | 85 | 4 | 890 | 212 | 855 | 22 | | | Present Invention Example |
| 86 | 86 | 4 | 880 | 331 | 875 | 20 | | | Present Invention Example |
| 87 | 87 | 41 | 870 | 192 | 849 | 28 | | | Present. Invention Example |
| 88 | 88 | 42 | 910 | 294 | 816 | 25 | | | Present Invention Example |
| 89 | 89 | 43 | 900 | 232 | 889 | 36 | | | Present Invention Example |
| 90 | 90 | 44 | 920 | 214 | 852 | 17 | | | Present Invention Example |

Underlines indicate that the corresponding values are outside the scope of the present invention and manufacturing conditions are not preferable.

TABLE 5-A-1

| | | | Microstructures | | Textures | | |
|---|---|---|---|---|---|---|---|
| | | | | | Ratio between pole density of orientation group consisting of {001} <1-10> to {001} <-1-10> and pole density of | Ratio between pole density of orientation group consisting of {001} <1-10> to {001} <-1-10> and pole density of | |
| Manufacturing No. | Steel sheet No. | Steel No. | Martensite, bainite, and tempered martensite (area %) | Ferrite and granular bainite (area %) | orientation group consisting of {111} <1-10> to {111} <-1-12> in texture of surface layer region | orientation group consisting of {111} <1-10> to {111} <-1-12> in texture of inside region | Decarburization amount Decarburization index |
| <u>1</u> | <u>1</u> | <u>1</u> | 100 | 0 | 1.6 | 2.0 | 0.194 |
| 2 | 2 | 2 | 98 | 2 | 1.5 | 2.1 | 0.228 |
| 3 | 3 | 3 | 97 | 3 | 1.7 | 1.9 | 0.274 |
| 4 | 4 | 4 | 98 | 2 | 1.7 | 2.2 | 0.300 |
| 5 | 5 | 5 | 98 | 2 | 1.5 | 2.2 | 0.340 |
| <u>6</u> | <u>6</u> | <u>6</u> | 98 | 2 | 1.5 | 2.2 | 0.396 |
| <u>7</u> | <u>7</u> | <u>7</u> | 96 | 4 | 1.6 | 2.2 | 0.313 |
| 8 | 8 | 8 | 100 | 0 | 1.6 | 1.9 | 0.297 |
| 9 | 9 | 9 | 100 | 0 | 1.6 | 2.2 | 0.270 |
| 10 | 10 | 10 | 97 | 3 | 1.7 | 2.1 | 0.266 |
| <u>11</u> | <u>11</u> | <u>11</u> | 99 | 1 | 1.6 | 2.0 | 0.263 |
| <u>12</u> | <u>12</u> | <u>12</u> | 100 | 0 | 1.7 | 2.1 | 0.271 |
| 13 | 13 | 13 | 95 | 5 | 1.7 | 2.2 | 0.296 |
| 14 | 14 | 14 | 97 | 3 | 1.7 | 2.2 | 0.305 |
| 15 | 15 | 15 | 97 | 3 | 1.7 | 2.2 | 0.299 |
| <u>16</u> | <u>16</u> | <u>16</u> | 99 | 1 | 1.7 | 1.9 | 0.309 |
| <u>17</u> | <u>17</u> | <u>17</u> | 99 | 1 | 1.7 | 2.0 | 0.281 |
| 18 | 18 | 18 | 99 | 1 | 1.7 | 2.2 | 0.300 |
| 19 | 19 | 19 | 100 | 0 | 1.6 | 2.0 | 0.299 |
| 20 | 20 | 20 | 96 | 4 | 1.7 | 1.9 | 0.307 |
| <u>21</u> | <u>21</u> | <u>21</u> | 100 | 0 | 1.7 | 2.2 | 0.278 |
| 22 | 22 | 22 | 98 | 2 | 1.7 | 2.2 | 0.288 |
| 23 | 23 | 23 | 95 | 5 | 1.6 | 2.0 | 0.310 |
| 24 | 24 | 24 | 99 | 1 | 1.6 | 1.9 | 0.277 |
| 25 | 25 | 25 | 98 | 2 | 1.6 | 2.1 | 0.290 |
| 26 | 26 | 26 | 98 | 2 | 1.7 | 2.2 | 0.281 |
| 27 | 27 | 27 | 95 | 5 | 1.7 | 2.2 | 0.303 |
| 28 | 28 | 28 | 96 | 4 | 1.6 | 2.2 | 0.281 |
| 29 | 29 | 29 | 98 | 2 | 1.6 | 2.2 | 0.280 |
| <u>30</u> | <u>30</u> | <u>30</u> | 95 | 5 | 1.8 | 1.9 | 0.266 |

| Manufacturing No. | Tensile strength TS (MPa) | Maximum bending angle α (°) | TS × α (MPa · °) | Load increase amount per unit bending angle in region from immediately after start of test to bending angle 20° (N/°) | Note |
|---|---|---|---|---|---|
| 1 | 1274 | 70 | 89180 | 354 | Comparative Example |
| 2 | <u>1585</u> | 69 | 102465 | <u>438</u> | Present Invention Example |
| 3 | 1728 | 65 | 112320 | 585 | Present Invention Example |
| 4 | 1920 | 53 | 101760 | 594 | Present Invention Example |
| 5 | 2400 | 53 | 127200 | 643 | Present Invention Example |
| 6 | 2646 | 28 | <u>74088</u> | 605 | Comparative Example |
| 7 | <u>1261</u> | 72 | <u>90792</u> | 384 | Comparative Example |
| 8 | <u>2090</u> | 52 | 108680 | <u>585</u> | Present Invention Example |
| 9 | 2178 | 72 | 156816 | 610 | Present Invention Example |
| 10 | 2112 | 51 | 107712 | 590 | Present Invention Example |
| <u>11</u> | 1274 | 75 | 95550 | <u>377</u> | Comparative Example |
| <u>12</u> | <u>1261</u> | 88 | 110968 | <u>395</u> | Comparative Example |
| 13 | <u>2000</u> | 56 | 112000 | <u>570</u> | Present Invention Example |
| 14 | 2090 | 79 | 165110 | 600 | Present Invention Example |
| 15 | 1980 | 57 | 112860 | 574 | Present Invention Example |
| 16 | 1940 | 33 | <u>64020</u> | 616 | Comparative Example |
| <u>17</u> | 1900 | 38 | <u>72200</u> | 600 | Comparative Example |
| <u>18</u> | 1960 | 52 | 101920 | 574 | Present Invention Example |
| 19 | 1980 | 55 | 108900 | 580 | Present Invention Example |
| 20 | 1960 | 57 | 111720 | 584 | Present Invention Example |
| <u>21</u> | 1960 | 34 | <u>66640</u> | 614 | Comparative Example |
| <u>22</u> | 1960 | 79 | 154840 | 622 | Present Invention Example |
| 23 | 1980 | 58 | 114840 | 574 | Present Invention Example |

TABLE 5-A-1-continued

| | | | | | |
|---|---|---|---|---|---|
| 24 | 2000 | 35 | 70000 | 560 | Comparative Example |
| 25 | 1940 | 64 | 124160 | 611 | Present Invention Example |
| 26 | 1920 | 55 | 105600 | 577 | Present Invention Example |
| 27 | 1940 | 29 | 56260 | 580 | Comparative Example |
| 28 | 1900 | 60 | 114000 | 619 | Present Invention Example |
| 29 | 1960 | 58 | 113680 | 572 | Present Invention Example |
| 30 | 2000 | 32 | 64000 | 587 | Comparative Example |

Underlines indicate that the corresponding values are outside the scope of the present invention and characteristics are not preferable.

TABLE 5-A-2

| | | | Microstructures | | Textures | | |
|---|---|---|---|---|---|---|---|
| | | | | | Ratio between pole density of orientation group consisting of {001} <1-10> to {001} <-1-10> and pole density of | Ratio between pole density of orientation group consisting of {001} <1-10> to {001} <-1-10> and pole density of | |
| Manufacturing No. | Steel sheet No. | Steel No. | Martensite, bainite, and tempered martensite (area %) | Ferrite and granular bainite (area %) | orientation group consisting of {111} <1-10> to {111} <-1-12> in texture of surface layer region | orientation group consisting of {111} <1-10> to {111} <-1-12> in texture of inside region | Decarburization amount Decarburization index |
| 31 | 31 | 31 | 95 | 5 | 1.5 | 2.0 | 0.291 |
| 32 | 32 | 32 | 99 | 1 | 1.6 | 2.2 | 0.310 |
| 33 | 33 | 33 | 97 | 3 | 1.7 | 1.9 | 0.279 |
| 34 | 34 | 34 | 100 | 0 | 1.5 | 2.0 | 0.279 |
| 35 | 35 | 35 | 97 | 3 | 1.6 | 1.9 | 0.271 |
| 36 | 36 | 36 | 96 | 4 | 1.6 | 2.2 | 0.314 |
| 37 | 37 | 37 | 95 | 5 | 1.7 | 2.1 | 0.261 |
| 38 | 38 | 38 | 95 | 5 | 1.5 | 1.9 | 0.251 |
| 39 | 39 | 39 | 98 | 2 | 1.7 | 2.0 | 0.281 |
| 40 | 40 | 40 | 97 | 3 | 1.7 | 2.1 | 0.266 |
| 41 | 41 | 4 | 97 | 3 | 2.1 | 2.7 | 0.284 |
| 42 | 42 | 4 | 99 | 1 | 1.4 | 1.4 | 0.305 |
| 43 | 43 | 4 | 100 | 0 | 2.1 | 2.7 | 0.297 |
| 44 | 44 | 4 | 100 | 0 | 2.0 | 2.7 | 0.278 |
| 45 | 45 | 4 | 100 | 0 | 0.9 | 1.7 | 0.269 |
| 46 | 46 | 4 | 100 | 0 | 2.2 | 2.9 | 0.259 |
| 47 | 47 | 4 | 97 | 3 | 2.1 | 2.6 | 0.273 |
| 48 | 48 | 4 | 95 | 5 | 1.4 | 1.7 | 0.298 |
| 49 | 49 | 4 | 100 | 0 | 2.3 | 2.8 | 0.263 |
| 50 | 50 | 4 | 100 | 0 | 2.2 | 2.7 | 0.269 |
| 51 | 51 | 4 | 97 | 3 | 1.3 | 1.7 | 0.283 |
| 52 | 52 | 4 | 98 | 2 | 2.0 | 2.8 | 0.281 |
| 53 | 53 | 4 | 95 | 5 | 2.1 | 2.6 | 0.262 |
| 54 | 54 | 4 | 95 | 5 | 1.7 | 1.9 | 0.294 |
| 55 | 55 | 4 | 100 | 0 | 0.8 | 1.5 | 0.280 |
| 56 | 56 | 4 | 95 | 5 | 1.5 | 1.6 | 0.276 |
| 57 | 57 | 4 | 97 | 3 | 1.7 | 2.2 | 0.250 |
| 58 | 58 | 4 | 95 | 5 | 2.0 | 2.9 | 0.263 |
| 59 | 59 | 4 | 95 | 5 | 1.0 | 1.6 | 0.259 |
| 60 | 60 | 4 | 97 | 3 | 1.7 | 1.9 | 0.254 |

| | Mechanical properties | | | | |
|---|---|---|---|---|---|
| Manufacturing No. | Tensile strength TS (MPa) | Maximum bending angle α (°) | TS × α (MPa · °) | Load increase amount per unit bending angle in region from immediately after start of test to bending angle 20° (N/°) | Note |
| 31 | 2208 | 68 | 150144 | 601 | Present Invention Example |
| 32 | 2208 | 75 | 165600 | 609 | Present Invention Example |
| 33 | 2254 | 73 | 164542 | 601 | Present Invention Example |
| 34 | 2231 | 80 | 178480 | 605 | Present Invention Example |
| 35 | 2208 | 72 | 158976 | 609 | Present Invention Example |
| 36 | 2254 | 71 | 160034 | 612 | Present Invention Example |
| 37 | 2231 | 65 | 145015 | 602 | Present Invention Example |
| 38 | 2090 | 51 | 106590 | 572 | Present Invention Example |
| 39 | 1940 | 70 | 135800 | 616 | Present Invention Example |

TABLE 5-A-2-continued

|  |  |  |  |  |  |
|---|---|---|---|---|---|
| 40 | 1900 | 67 | 127300 | 604 | Present Invention Example |
| <u>41</u> | 1980 | 33 | <u>65340</u> | 518 | Comparative Example |
| 42 | 1960 | 60 | 117600 | 625 | Present Invention Example |
| <u>43</u> | 1960 | 34 | <u>66640</u> | 515 | Comparative Example |
| <u>44</u> | 1920 | 38 | <u>72960</u> | 499 | Comparative Example |
| 45 | 1900 | 64 | 121600 | 617 | Present Invention Example |
| <u>46</u> | 1920 | 32 | <u>61440</u> | 515 | Comparative Example |
| <u>47</u> | 1980 | 33 | <u>65340</u> | 492 | Comparative Example |
| 48 | 1920 | 75 | 144000 | 604 | Present Invention Example |
| <u>49</u> | 1900 | 34 | <u>64600</u> | 503 | Comparative Example |
| <u>50</u> | 2000 | 32 | <u>64000</u> | 517 | Comparative Example |
| 51 | 2000 | 79 | 158000 | 610 | Present Invention Example |
| <u>52</u> | 1980 | 35 | <u>69300</u> | 516 | Comparative Example |
| <u>53</u> | 1940 | 31 | <u>60140</u> | 506 | Comparative Example |
| 54 | 1980 | 51 | 100980 | 591 | Present Invention Example |
| 55 | 1960 | 76 | 148960 | 621 | Present Invention Example |
| 56 | 1960 | 78 | 152880 | 623 | Present Invention Example |
| 57 | 1920 | 57 | 109440 | 572 | Present Invention Example |
| <u>58</u> | 1920 | 35 | <u>67200</u> | 515 | Comparative Example |
| 59 | 1920 | 68 | 130560 | 611 | Present Invention Example |
| 60 | 1940 | 51 | 98940 | 583 | Present Invention Example |

Underlines indicate that the corresponding values are outside the scope of the present invention and characteristics are not preferable.

TABLE 5-A-3

| | | | Microstructures | | Textures | | |
|---|---|---|---|---|---|---|---|
| Manufacturing No. | Steel sheet No. | Steel No. | Martensite, bainite, and tempered martensite (area %) | Ferrite and granular bainite (area %) | Ratio between pole density of orientation group consisting of {001} <1-10> to {001} <-1-10> and pole density of orientation group consisting of {111} <1-10> to {111} <-1-12> in texture of surface layer region | Ratio between pole density of orientation group consisting of {001} <1-10> to {001} <-1-10> and pole density of orientation group consisting of {111} <1-10> to {111} <-1-12> in texture of inside region | Decarburization amount Decarburization index |
| <u>61</u> | <u>61</u> | 4 | 100 | 0 | 2.2 | 2.9 | 0.301 |
| <u>62</u> | <u>62</u> | 4 | 98 | 2 | <u>1.5</u> | <u>2.1</u> | 0.290 |
| 63 | 63 | 4 | 100 | 0 | 1.5 | 2.0 | 0.290 |
| 64 | 64 | 4 | 98 | 2 | 2.0 | 2.1 | 0.079 |
| <u>65</u> | <u>65</u> | 4 | 100 | 0 | <u>1.5</u> | 2.1 | 0.179 |
| 66 | 66 | 4 | 95 | 5 | 1.2 | 1.5 | 0.241 |
| 67 | 67 | 4 | 97 | 3 | 1.7 | 1.9 | 0.372 |
| <u>68</u> | <u>68</u> | 4 | 99 | 1 | <u>2.2</u> | 2.1 | 0.540 |
| <u>69</u> | <u>69</u> | 4 | 99 | 1 | <u>2.3</u> | 1.9 | 0.036 |
| <u>70</u> | <u>70</u> | 4 | 99 | 1 | <u>1.7</u> | 2.2 | 0.117 |
| 71 | 71 | 4 | 99 | 1 | 1.3 | 1.8 | 0.278 |
| 72 | 72 | 4 | 95 | 5 | 1.5 | 2.1 | 0.453 |
| <u>73</u> | <u>73</u> | 4 | 96 | 4 | 2.0 | <u>2.3</u> | 0.534 |
| <u>74</u> | <u>74</u> | 4 | 96 | 4 | <u>1.7</u> | <u>2.2</u> | 0.264 |
| 75 | 75 | 4 | 99 | 1 | 1.6 | 1.9 | 0.319 |
| <u>76</u> | 76 | 4 | 99 | 1 | 2.0 | 2.9 | 0.293 |
| <u>77</u> | 77 | 4 | 95 | 5 | <u>1.5</u> | <u>2.2</u> | 0.295 |
| <u>78</u> | 78 | 4 | 100 | 0 | 1.5 | 2.6 | 0.284 |
| <u>79</u> | 79 | 4 | 100 | 0 | <u>1.9</u> | <u>2.8</u> | 0.305 |
| <u>80</u> | 80 | 4 | 97 | 3 | <u>1.7</u> | <u>1.9</u> | 0.301 |
| <u>81</u> | 81 | 4 | 95 | 5 | 1.5 | <u>2.6</u> | 0.291 |
| <u>82</u> | 82 | 4 | <u>85</u> | <u>15</u> | 1.6 | <u>2.0</u> | 0.267 |
| <u>83</u> | 83 | 4 | <u>97</u> | <u>3</u> | 1.6 | 2.2 | 0.276 |
| <u>84</u> | 84 | 4 | 100 | 0 | 1.6 | 2.7 | 0.312 |
| <u>85</u> | 85 | 4 | 98 | 2 | 1.5 | <u>2.2</u> | 0.276 |
| 86 | 86 | 4 | 99 | 1 | 1.7 | 1.9 | 0.255 |
| 87 | 87 | 41 | 98 | 2 | 1.6 | 2.0 | 0.295 |
| 88 | 88 | 42 | 96 | 4 | 1.6 | 1.9 | 0.321 |
| 89 | 89 | 43 | 95 | 5 | 1.6 | 1.9 | 0.274 |
| 90 | 90 | 44 | 97 | 3 | 1.7 | 2.0 | 0.290 |

TABLE 5-A-3-continued

| | Mechanical properties | | | | |
|---|---|---|---|---|---|
| Manufacturing No. | Tensile strength TS (MPa) | Maximum bending angle α (°) | TS × α (MPa · °) | Load increase amount per unit bending angle in region from immediately after start of test to bending angle 20° (N/°) | Note |
| <u>61</u> | 1940 | 33 | <u>64020</u> | 518 | Comparative Example |
| <u>62</u> | 1920 | 55 | 105600 | 582 | Present Invention Example |
| 63 | 1940 | 55 | 106700 | 592 | Present Invention Example |
| <u>64</u> | 1900 | 38 | <u>72200</u> | 566 | Comparative Example |
| <u>65</u> | 1940 | 56 | 108640 | 588 | Present Invention Example |
| 66 | 1960 | 74 | 145040 | 608 | Present Invention Example |
| 67 | 1900 | 51 | 96900 | 578 | Present Invention Example |
| <u>68</u> | 1992 | 37 | <u>74010</u> | 588 | Comparative Example |
| <u>69</u> | 1980 | 33 | <u>65340</u> | 560 | Comparative Example |
| <u>70</u> | 2000 | 55 | 110000 | 582 | Present Invention Example |
| 71 | 1980 | 77 | 152460 | 621 | Present Invention Example |
| 72 | 1900 | 52 | 98800 | 563 | Present Invention Example |
| <u>73</u> | 1998 | 37 | <u>74410</u> | 587 | Comparative Example |
| <u>74</u> | 1960 | 53 | 103880 | 593 | Present Invention Example |
| 75 | 1980 | 57 | 112860 | 590 | Present Invention Example |
| <u>76</u> | 1980 | 35 | <u>69300</u> | 564 | Comparative Example |
| <u>77</u> | 1900 | 52 | 98800 | 569 | Present Invention Example |
| <u>78</u> | 1980 | 37 | <u>73260</u> | 498 | Comparative Example |
| <u>79</u> | 1960 | 29 | <u>56840</u> | 576 | Comparative Example |
| <u>80</u> | 1940 | 54 | 104760 | 561 | Present Invention Example |
| 81 | 1980 | 36 | 71280 | 506 | Comparative Example |
| <u>82</u> | 1960 | 54 | 105840 | <u>345</u> | Comparative Example |
| <u>83</u> | 1980 | 57 | 112860 | <u>571</u> | Present Invention Example |
| 84 | 1920 | 57 | 109440 | <u>355</u> | Comparative Example |
| <u>85</u> | 1920 | 55 | 105600 | <u>575</u> | Present Invention Example |
| 86 | 1960 | 51 | 99960 | 569 | Present Invention Example |
| 87 | 2042 | 51 | 104142 | 584 | Present Invention Example |
| 88 | 1972 | 56 | 110432 | 565 | Present Invention Example |
| 89 | 1972 | 55 | 108460 | 583 | Present Invention Example |
| 90 | 1916 | 53 | 101548 | 577 | Present Invention Example |

Underlines indicate that the corresponding values are outside the scope of the present invention and characteristics are not preferable.

INDUSTRIAL APPLICABILITY

According to the above-described aspects of the present invention, it is possible to provide a hot-stamping formed body having excellent strength and bendability and having high load capacity and a steel sheet for hot stamping enabling the obtainment of this hot-stamping formed body.

The invention claimed is:

1. A steel sheet for hot stamping comprising, as a chemical composition, by mass %:
C: 0.15 to 0.50%;
Si: 0.0010% to 3.000%;
Mn: 0.30% to 3.00%;
Al: 0.0002% to 2.000%;
P: 0.100% or less;
S: 0.1000% or less;
N: 0.0100% or less;
Nb: 0% to 0.15%;
Ti: 0% to 0.15%;
V: 0% to 0.15%;
Mo: 0% to 1.0%;
Cr: 0% to 1.0%;
Cu: 0% to 1.0%;
Ni: 0% to 1.0%;
B: 0% to 0.0100%;
Ca: 0% to 0.010%;
REM: 0% to 0.30%; and
a remainder consisting of Fe and an impurity,
wherein the steel sheet for hot stamping has a metallographic structure consisting of, by area ratio, a total of 20% to 80% of ferrite, granular bainite, bainite, and martensite and a remainder in microstructure consisting of pearlite and a carbide,
in a texture between a surface and a sheet thickness ¼ position from the surface, a ratio between a pole density of an orientation group consisting of {001}<1-10> to {001}<-1-10> and a pole density of an orientation group consisting of {111}<1-10> to {111}<-1-12> is less than 1.5, and
in a texture between the sheet thickness ¼ position from the surface and a sheet thickness ½ position from the surface, a ratio between a pole density of an orientation group consisting of {001}<1-10> to {001}<-1-10> and a pole density of an orientation group consisting of {111}<1-10> to {111}<-1-12> is less than 2.0.

2. The steel sheet for hot stamping according to claim 1, further comprising, as the chemical composition, by mass %, one or more of the group of:
Nb: 0.05% to 0.15%,
Ti: 0.05% to 0.15%,
V: 0.05% to 0.15%,
Mo: 0.05% to 1.0%,
Cr: 0.05% to 1.0%,
Cu: 0.05% to 1.0%,
Ni: 0.05% to 1.0%,
B: 0.0001% to 0.0100%,
Ca: 0.001% to 0.010%, and
REM: 0.001% to 0.30%.

3. The steel sheet for hot stamping according to claim 1, wherein a decarburization index is 0.085 or more.

4. The steel sheet for hot stamping according to claim 2, wherein a decarburization index is 0.085 or more.

5. A hot-stamping formed body comprising, as a chemical composition, by mass %:
C: 0.15 to 0.50%;
Si: 0.0010% to 3.000%;
Mn: 0.30% to 3.00%;
Al: 0.0002% to 2.000%;
P: 0.100% or less;
S: 0.1000% or less;
N: 0.0100% or less;
Nb: 0% to 0.15%;
Ti: 0% to 0.15%;
V: 0% to 0.15%;
Mo: 0% to 1.0%;
Cr: 0% to 1.0%;
Cu: 0% to 1.0%;
Ni: 0% to 1.0%;
B: 0% to 0.0100%;
Ca: 0% to 0.010%;
REM: 0% to 0.30%; and
a remainder consisting of Fe and an impurity,
wherein the hot-stamping formed body has a metallographic structure containing, by area ratio, a total of 90% or more of martensite, bainite, and tempered martensite,
in a texture between a surface and a sheet thickness ¼ position from the surface, a ratio between a pole density of an orientation group consisting of {001}<1-10> to {001}<-1-10> and a pole density of an orientation group consisting of {111}<1-10> to {111}<-1-12> is less than 1.8, and
in a texture between the sheet thickness ¼ position from the surface and a sheet thickness ½ position from the surface, a ratio between a pole density of an orientation group consisting of {001}<1-10> to {001}<-1-10> and a pole density of an orientation group consisting of {111}<1-10> to {111}<-1-12> is less than 2.3.

6. The hot-stamping formed body according to claim 5, further comprising, as the chemical composition, by mass %, one or more of the group of:
Nb: 0.05% to 0.15%,
Ti: 0.05% to 0.15%,
V: 0.05% to 0.15%,
Mo: 0.05% to 1.0%,
Cr: 0.05% to 1.0%,
Cu: 0.05% to 1.0%,
Ni: 0.05% to 1.0%,
B: 0.0001% to 0.0100%,
Ca: 0.001% to 0.010%, and
REM: 0.001% to 0.30%.

7. The hot-stamping formed body according to claim 5, wherein a decarburization index is 0.085 or more.

8. The hot-stamping formed body according to claim 1, wherein a decarburization index is 0.085 or more.

9. A steel sheet for hot stamping comprising, as a chemical composition, by mass %:
C: 0.15 to 0.50%;
Si: 0.0010% to 3.000%;
Mn: 0.30% to 3.00%;
Al: 0.0002% to 2.000%;
P: 0.100% or less;
S: 0.1000% or less;
N: 0.0100% or less;
Nb: 0% to 0.15%;
Ti: 0% to 0.15%;
V: 0% to 0.15%;
Mo: 0% to 1.0%;
Cr: 0% to 1.0%;
Cu: 0% to 1.0%;
Ni: 0% to 1.0%;
B: 0% to 0.0100%;
Ca: 0% to 0.010%;
REM: 0% to 0.30%; and
a remainder comprising Fe and an impurity,
wherein the steel sheet for hot stamping has a metallographic structure comprising, by area ratio, a total of 20% to 80% of ferrite, granular bainite, bainite, and martensite and a remainder in microstructure comprising pearlite and a carbide,
in a texture between a surface and a sheet thickness ¼ position from the surface, a ratio between a pole density of an orientation group comprising {001}<1-10> to {001}<-1-10> and a pole density of an orientation group comprising {111}<1-10> to {111}<-1-12> is less than 1.5, and
in a texture between the sheet thickness ¼ position from the surface and a sheet thickness ½ position from the surface, a ratio between a pole density of an orientation group comprising {001}<1-10> to {001}<-1-10> and a pole density of an orientation group comprising {111}<1-10> to {111}<-1-12> is less than 2.0.

10. A hot-stamping formed body comprising, as a chemical composition, by mass %:
C: 0.15 to 0.50%;
Si: 0.0010% to 3.000%;
Mn: 0.30% to 3.00%;
Al: 0.0002% to 2.000%;
P: 0.100% or less;
S: 0.1000% or less;
N: 0.0100% or less;
Nb: 0% to 0.15%;
Ti: 0% to 0.15%;
V: 0% to 0.15%;
Mo: 0% to 1.0%;
Cr: 0% to 1.0%;
Cu: 0% to 1.0%;
Ni: 0% to 1.0%;
B: 0% to 0.0100%;
Ca: 0% to 0.010%;
REM: 0% to 0.30%; and
a remainder comprising Fe and an impurity,
wherein the hot-stamping formed body has a metallographic structure containing, by area ratio, a total of 90% or more of martensite, bainite, and tempered martensite,
in a texture between a surface and a sheet thickness ¼ position from the surface, a ratio between a pole density of an orientation group comprising {001}<1-10> to {001}<-1-10> and a pole density of an orientation group comprising {111}<1-10> to {111}<-1-12> is less than 1.8, and
in a texture between the sheet thickness ¼ position from the surface and a sheet thickness ½ position from the surface, a ratio between a pole density of an orientation group comprising {001}<1-10> to {001}<-1-10> and a pole density of an orientation group comprising {111}<1-10> to {111}<-1-12> is less than 2.3.

* * * * *